Nov. 12, 1935.　　　D. A. YOUNG　　　2,020,925
CARD SORTING MACHINE
Filed June 2, 1933　　12 Sheets-Sheet 1

WITNESSES:

INVENTOR
Douglass A. Young.
BY
ATTORNEY

Nov. 12, 1935.   D. A. YOUNG   2,020,925
CARD SORTING MACHINE
Filed June 2, 1933   12 Sheets-Sheet 2

WITNESSES:
E.C. Leising
F.T. Hicks

INVENTOR
Douglass A. Young.
BY
ATTORNEY

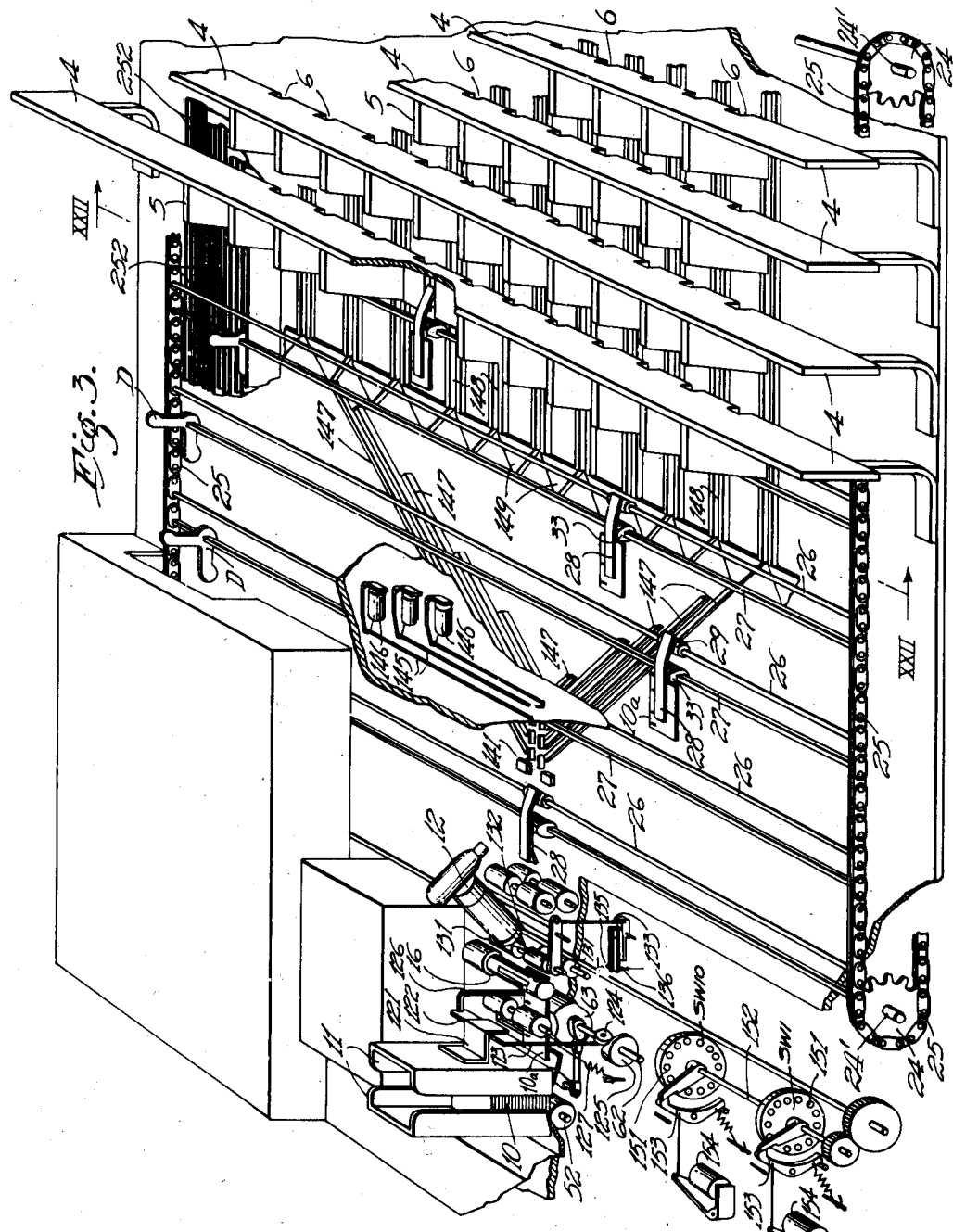

Nov. 12, 1935.　　　D. A. YOUNG　　　2,020,925
CARD SORTING MACHINE
Filed June 2, 1933　　12 Sheets-Sheet 4
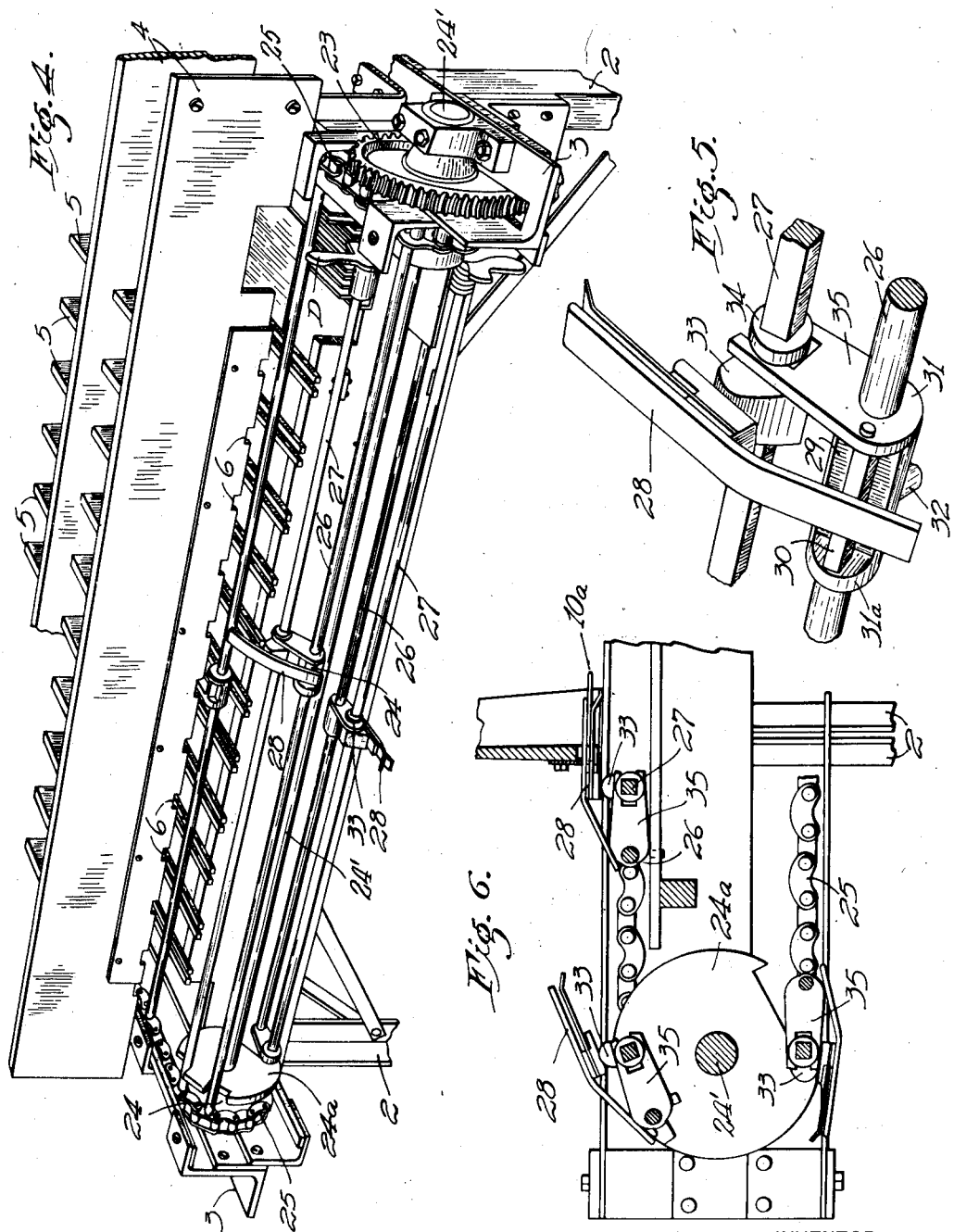
WITNESSES:
INVENTOR
Douglass A. Young.
BY
ATTORNEY Nov. 12, 1935.  D. A. YOUNG  2,020,925
CARD SORTING MACHINE
Filed June 2, 1933   12 Sheets-Sheet 5
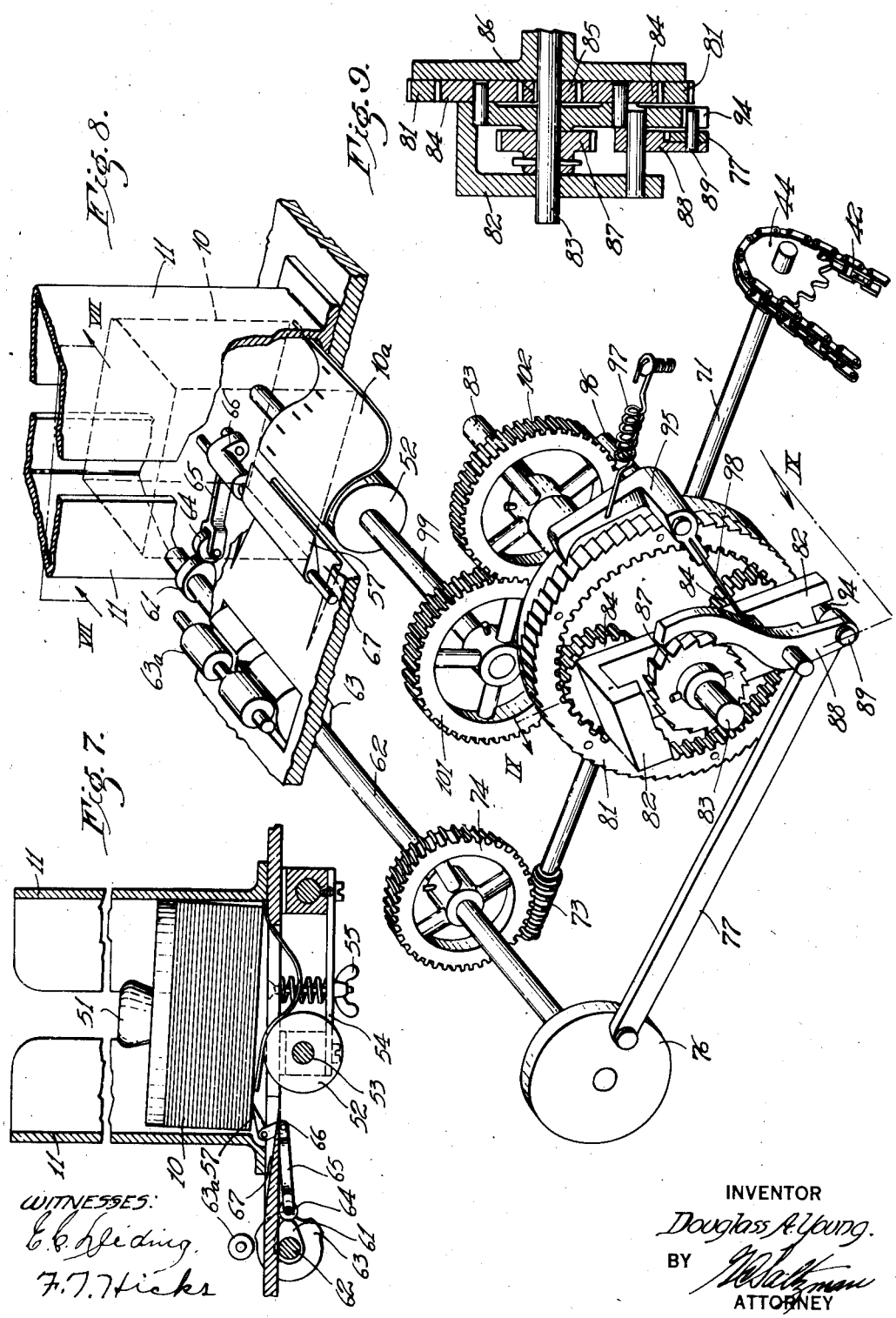
INVENTOR
Douglass A. Young.
BY
ATTORNEY Nov. 12, 1935.                D. A. YOUNG                2,020,925
                          CARD SORTING MACHINE
                    Filed June 2, 1933      12 Sheets-Sheet 6
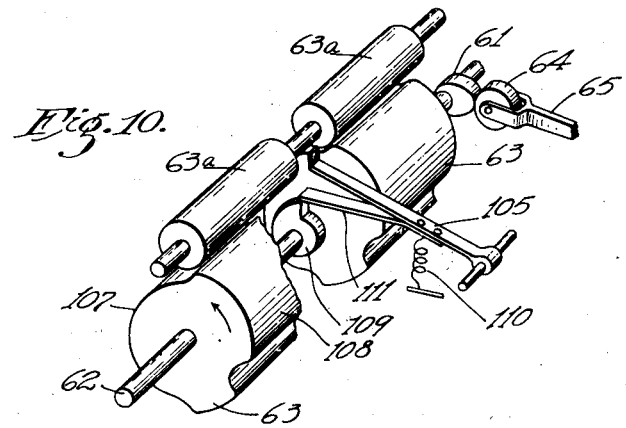
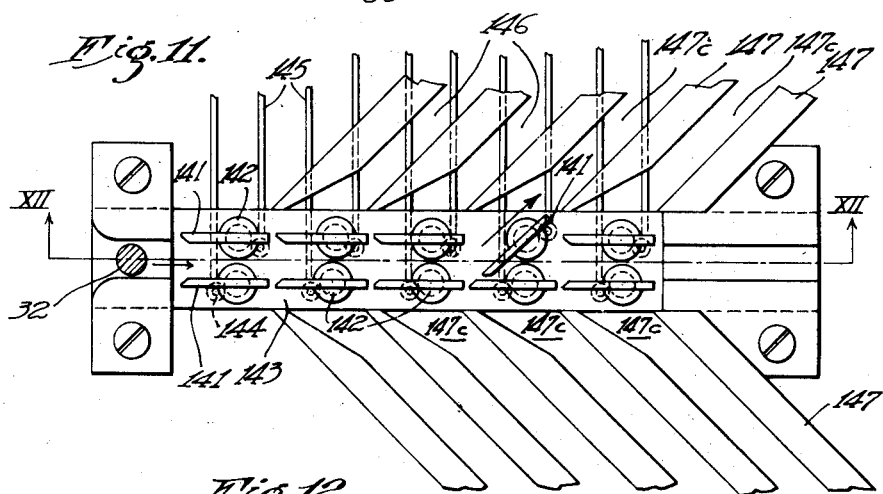
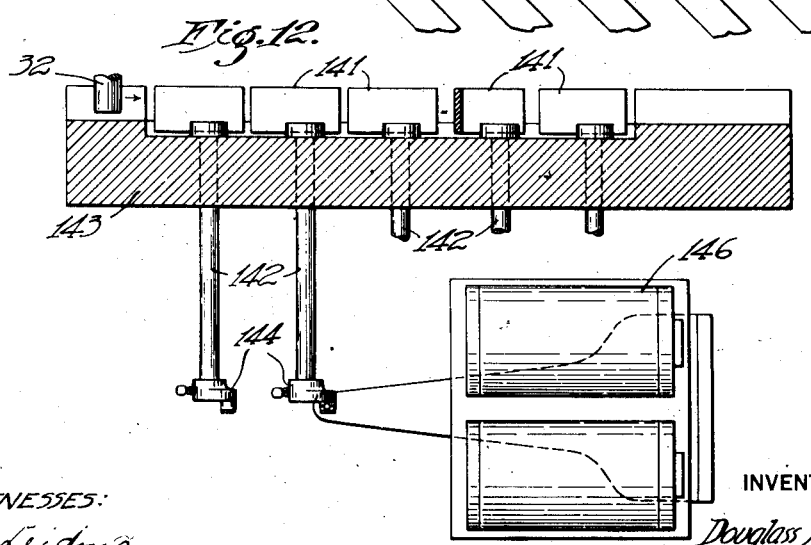

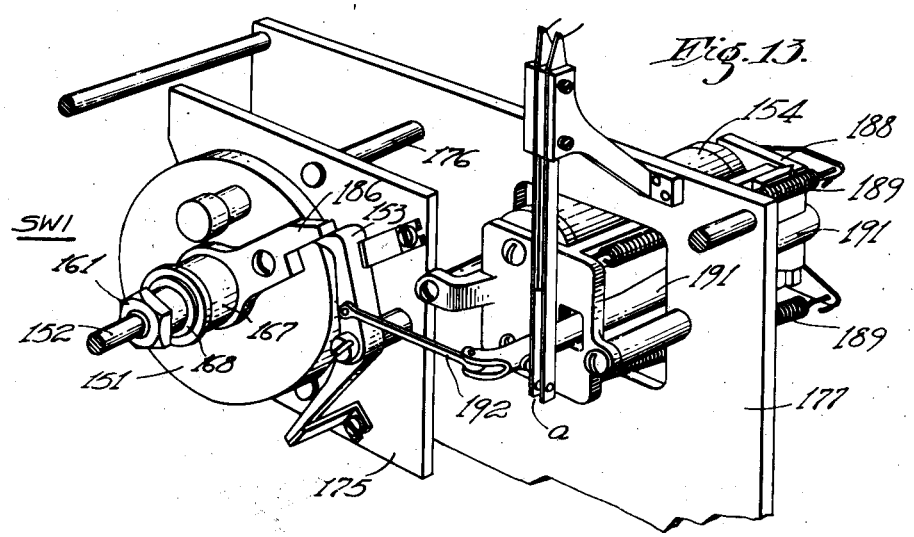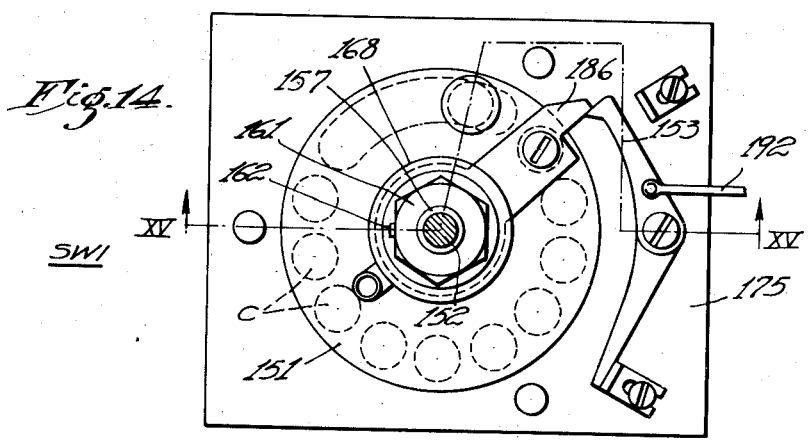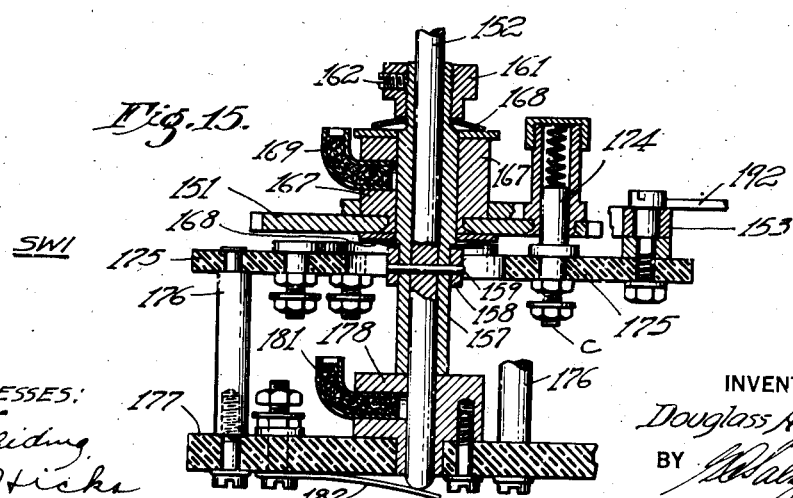

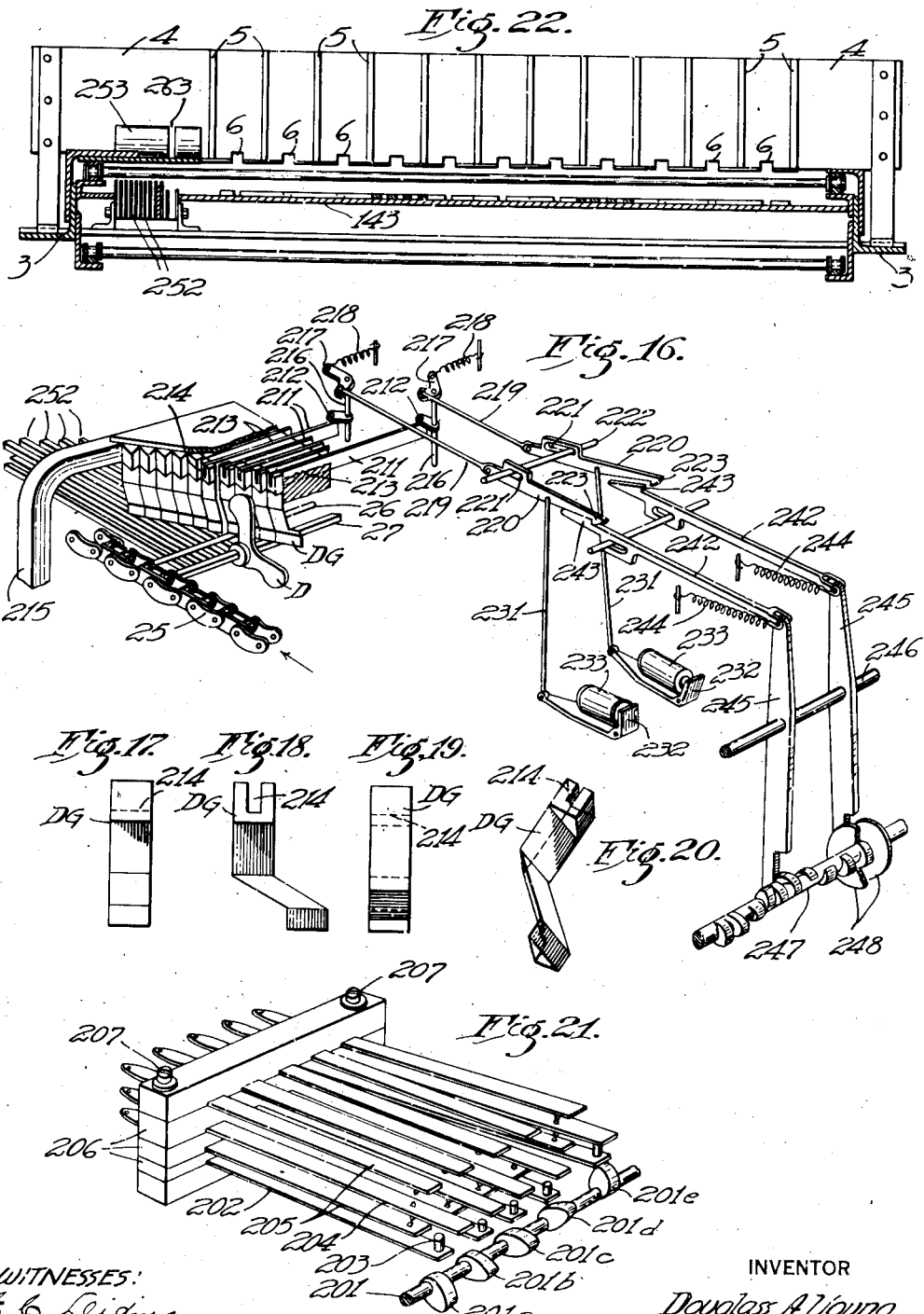

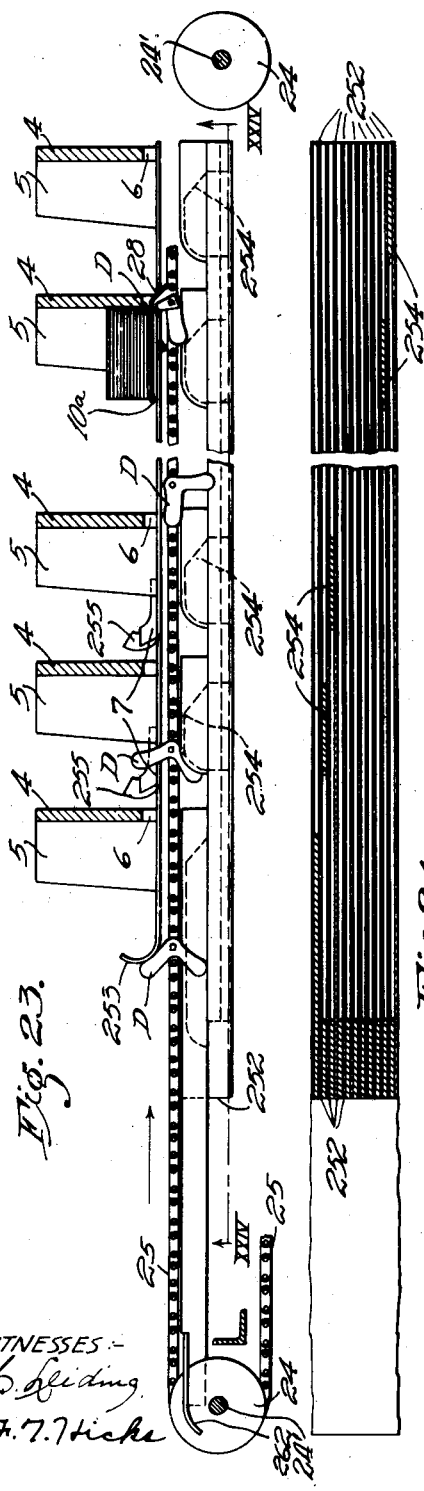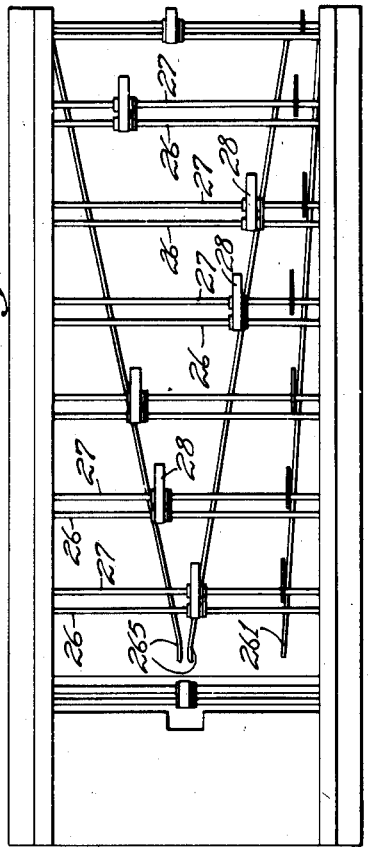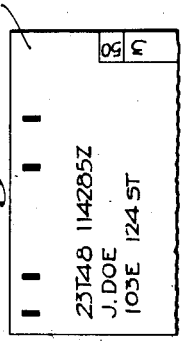

Nov. 12, 1935.        D. A. YOUNG         2,020,925
                   CARD SORTING MACHINE
                Filed June 2, 1933    12 Sheets-Sheet 10
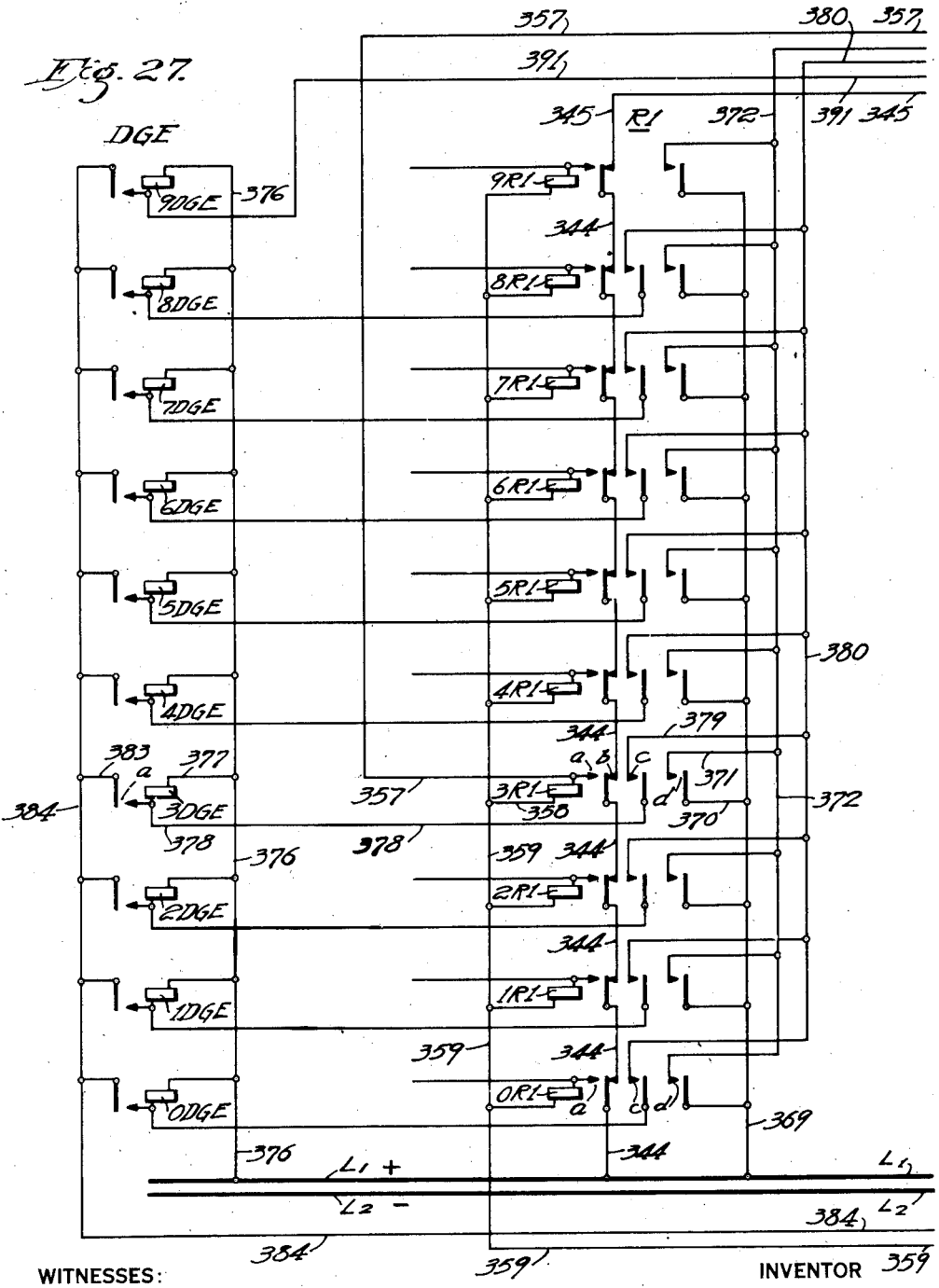

Patented Nov. 12, 1935

2,020,925

UNITED STATES PATENT OFFICE 2,020,925

CARD SORTING MACHINE

Douglass A. Young, East Orange, N. J., assignor to Westinghouse Electric & Manufacturing Company, East Pittsburgh, Pa., a corporation of Pennsylvania Application June 2, 1933, Serial No. 674,016

15 Claims. (Cl. 209—111)

My invention pertains to sorting machines, and more particularly to machines for sorting documents or articles, such as bank checks and other commercial paper, mail, stubs such as those torn from billing post-cards or bills, and the like, having coded indicia thereon.

In the following description of the invention, I have referred specifically to the use of my machine for sorting the stubs of billing post cards, which are usually detached and returned with the remittance to the vendor, such as a plublic utility company, but it will be quite obvious that my sorting machine may be used for sorting various documents or cards such as receipt stubs, bank checks, mailing matter, or the like, and instead of a "sorting" operation the machine or parts thereof embodying the invention may be employed for tabulating, bookkeeping, enumerating or other accounting operations usually performed by business machines.

Sorting machines previously available are limited in application to the sorting of especially dimensioned cards and employ mechanical selecting and distributing means responsive to systems of perforations and the position of such perforations with respect to the edges of the card. Such machines cannot be utilized for sorting documents or articles which cannot be perforated and they require that the cards be quite uniform in size, form, and thickness, and that the perforations be in perfect condition during the sorting process. For example, such machines cannot be employed for sorting bank checks or mail, because perforations are prohibited, and, in the case of many classes of documents, handling prior to sorting results in a mutilation of deformation precluding the use of such machines. As a result, such prior machines may not be used to sort original documents, and are limited to cards which are special in dimensions and are preformed, by a separate operation, with perforations indicative of information on the original document.

It is accordingly an object of my invention to provide an improved feeding mechanism for sorting machines, which will successfully feed documents that have been marred or deformed as by mailing or handling.

It is a further object of my invention to provide an improved device for scanning documents which are not in perfect condition as to dimensions.

It is also an object of my invention to provide an improved sorting machine which will, in one progressive operation, sort documents to a maximum number of pockets with a minimum amount of mechanism and controlling apparatus.

Another object of my invention is to provide an improved mechanism for automatically depositing the documents in their respective pockets in accordance with data on the documents or a function of such data.

A further object of my invention is to provide a simplified distributing mechanism and control system whereby documents may be sorted to a great number of pockets which may be arranged in a coordinate system.

Another object of my invention is to provide a sorting machine with various safety and checking devices to prevent erroneous delivery of a document upon the occurrence of various abnormal conditions.

In accordance with my invention, the documents to be sorted have printed thereon a coded indication of a record which controls the sorting operation, said code being placed thereon simultaneously with the printing or typing of the document or as an incident in the normal or intended use of the document. The documents may comprise, by way of example, the stubs which usually constitute a part of billing post cards mailed each month by gas and electric companies, and which are returned to the company by the customers as the bills are paid. Since these constitute a record of payment they must be routed through a number of bookkeepers so that entries may be made in the proper ledgers. It is necessary to sort the stubs, therefore, in accordance with the alphabetical order of the customers' names, geographically, according to the billing dates, or otherwise. For this purpose the stubs are provided with a series of black marks which may be printed thereon at the time the post cards are addressed.

In many offices, documents or cards are marked from previously prepared stencils, plates, or mats which are used repeatedly in such devices as "Multigraph" or "Addressograph" machines. In accordance with my invention such stencils, plates, or mats are also provided with the impressions for making the marks corresponding to the code marks which are to be associated with the particular name, address, or other data thereon. By this convenient arrangement the code marks are placed on the card or document simultaneously with the other data and it is not necessary to subject the documents to an additional operation such as punching.

The documents, or stubs, to be sorted are placed in a stack at the end of the machine from which they are fed, one at a time, by a special feed mechanism comprising a soft roll of live rubber, and a reciprocating planetary gear mechanism. The feed mechanism is especially effective in handling the cards which have been damaged and marred by mailing, and as each document is removed from the bottom of the stack it passes through a timing release and a squaring mechanism which ensure that it is timed and positioned correctly for scanning, after which it is fed through the scanning rollers. As the card or document enters between the scanning rolls the slight separation caused by the thickness thereof is sufficient to operate a pair of contacts to complete the relay and amplifier circuits.

While the card is passing through the scanning rollers it is scanned by a beam of light, and the light reflected therefrom impinges upon an adjacent light sensitive photo-cell. The marks on the card cause the intensity of the reflected light to vary and the photo-cell sets up corresponding impulses which actuate selectors and relays to control the card distributing system.

The absorption of light by the first black mark on the card creates an impulse which releases the rotor of the "tens" selector switch, which then rotates in synchronism with the motion of the card in the scanner, and successively engages its stud contacts each of which is connected to one relay of a bank of supervisory high speed telephone relays. The relays are not energized because the rotating brush is not energized. When the light beam passes over the second black mark, the reflected light is absorbed setting up an impulse which energizes the rotating brush, consequently energizing the stud contact of the selector switch, which is at that instant engaged, and the relay in connection therewith. The particular supervisory relay of the bank selected thus depends upon the distance between the first and second marks on the card and is therefore entirely unaffected by the position of the marks on the card or their distance from the edges of the card.

The supervisory relays are so connected that, when they are closed by an impulse from said selector switch, they will remain closed, or locked in, until released later by an independent cam actuated contact. The relays are interconnected so that only one can remain locked in at a time. Hence, after the second mark passes, one supervisory relay of the first bank of relays holds the number corresponding to the distance between the marks. This may correspond to the "tens" digit of the card number.

Another selector switch, which may be referred to as the "units" switch, is now connected by a transfer relay for control by the light sensitive photo-cell. The absorption of the light beam by the third black mark creates an impulse which releases the contactor of the units selector. The latter rotates and successively engages its stud contacts each of which is connected to one of a bank of supervisory relays, referred to as the units relays. As the fourth mark on the card absorbs the light beam, an impulse is created which causes the energization of the particular units relay which is at that instant connected by the units selector. This setup corresponds to the units digit of the card number.

After the card or document has been scanned, it is received by a card clip which is slidably supported on a rod extending between endless sprocket chains. To overcome difficulties caused by crumpled or broken cards or documents which do not have sufficient stiffness, means is provided to give the document a slight longitudinal buckle, giving it sufficient stiffness to ensure its properly entering the clip. The card clip carries the card toward the pockets which are arranged in rows both laterally and horizontally. As the card moves toward the pockets, a cam actuated switch closes and permits the preset tens relay to actuate a corresponding mechanical gate which diverts a pin, projecting from the card clip, into a selected guideway and which thereby causes the card clip to be laterally shifted in line with the horizontal column of pockets corresponding to the tens digit of the number of the card.

The document is now carried along passing freely under the rows of pockets until it approaches the lateral row of pockets corresponding to the units digit previously set up. As this row is approached, the card clip is tilted upward and the card clip now passes through the bottom of the selected pocket, depositing its card on the bottom of the stack by a unique operation to be described in detail hereafter.

The invention itself, however, both as to its organization and its method of operation, together with additional objects and advantages thereof, will best be understood from the following detailed description, taken in conjunction with the accompanying drawings, in which:

Fig. 3 is a perspective view showing a machine having portions cut away to expose additional details;

Fig. 4 is a perspective detail view of the rear end of a machine;

Fig. 5 is an enlarged perspective view of a single card holder showing in detail the slidably mounted bracket for supporting the same on a transverse rod, and the associated cam for tilting it to card depositing position;

Fig. 6 is a detail view partly in section showing a sprocket chain wheel and the cooperative sprocket chain with its associated transverse carrier rods, cam bars and card holders carried thereby;

Fig. 7 is a sectional view on line VII—VII of Fig. 8 showing the relation of the cards in the card hopper to the cooperative card separating roll and knife disposed thereunder;

Fig. 8 is a perspective view showing the specific oscillatory planetary gear mechanism which drives the card separating roll and knife associated with the card hopper;

Fig. 9 is a detail sectional view taken on line IX—IX of Fig. 8;

Fig. 10 is a perspective view showing in detail the card feeding rollers and the timing cam for operating the card stop timer shown in conjunction therewith;

Fig. 11 is a plan view showing the angularly disposed guideways or tracks, and the associated gates for laterally deflecting the guide pins into their respective selected tracks to determine the lateral destination of the cards;

Fig. 12 is a sectional view taken on line XII—XII of Fig. 11 and showing the electromagnetic actuator associated with one of the gates;

Figs. 13 and 14 are respectively perspective, and elevation views showing the structure of one of the selector switches with its electromagnetic acuator;

Fig. 15 is a sectional view thereof taken along the line XV—XV of Fig. 14;

Fig. 16 is a detail perspective view showing the gates for determining the longitudinal delivery of the cards, and associated actuating mechanism for two of the gates, one of which is shown in the actuated position with the gate opened;

Figs. 17, 18, 19 and 20 are elevational and perspective views respectively showing one of the gate elements in detail;

Fig. 21 is a perspective view showing a cam commutator comprising a cam shaft and a plurality of resilient contact members which are disposed for actuation thereby;

Fig. 22 is a transverse sectional view taken across the machine on line XXII—XXII of Fig. 3;

Fig. 23 is a longitudinal sectional view showing the dogs carried by the chains in associated relation to various cams disposed along the path of travel for depositing a card from the card holder to any selected longitudinal card pocket;

Fig. 24 is a sectional view taken on line XXIV—XXIV of Fig. 23 to show the tracks and cams for guiding and actuating the dogs;

Fig. 25 is a bottom plan view of a machine showing the angularly disposed guide rails for slidably engaging the card holders and the dogs to reset them to an initial position as they return to the front of the machine;

Figure 28:
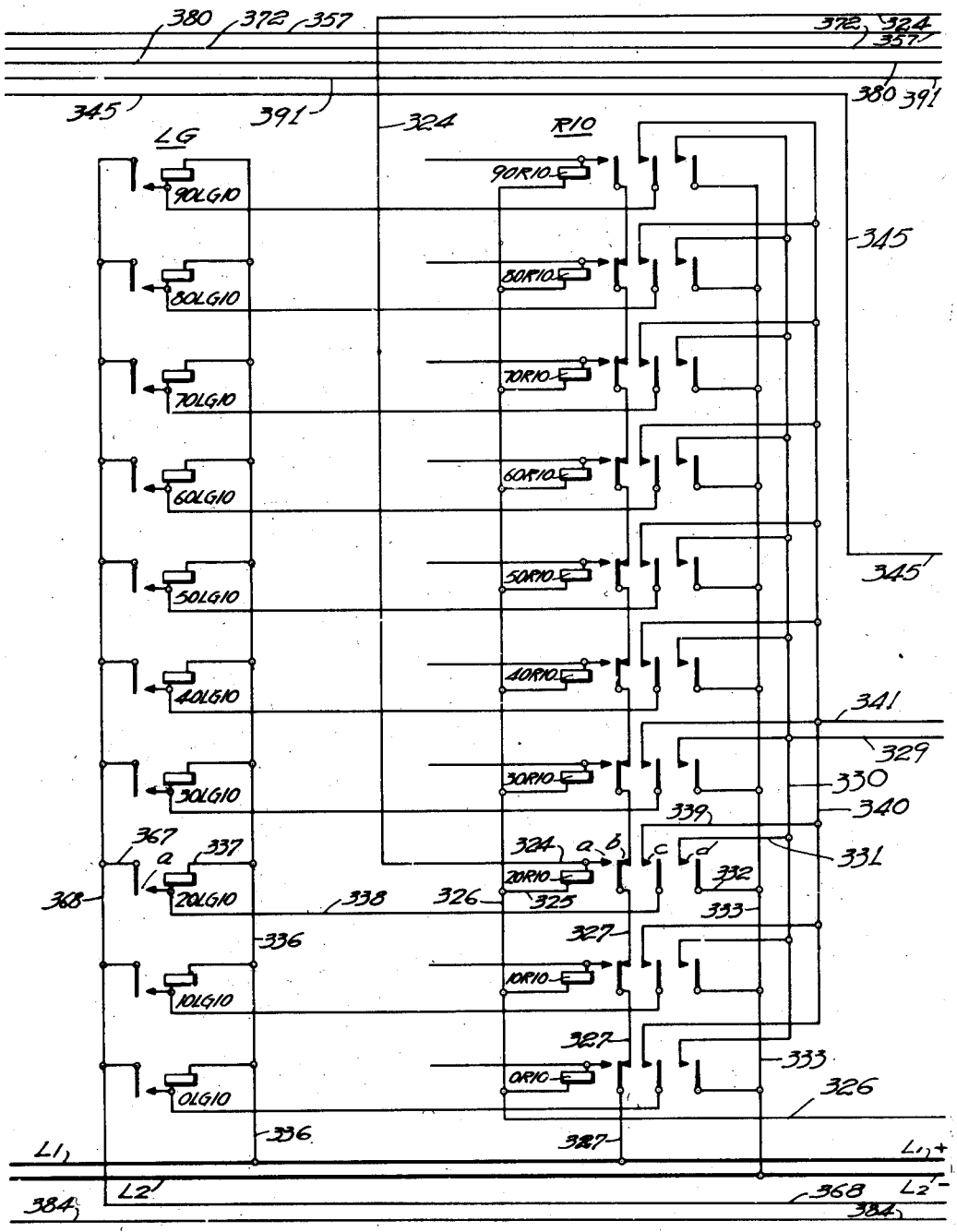
Figure 29:
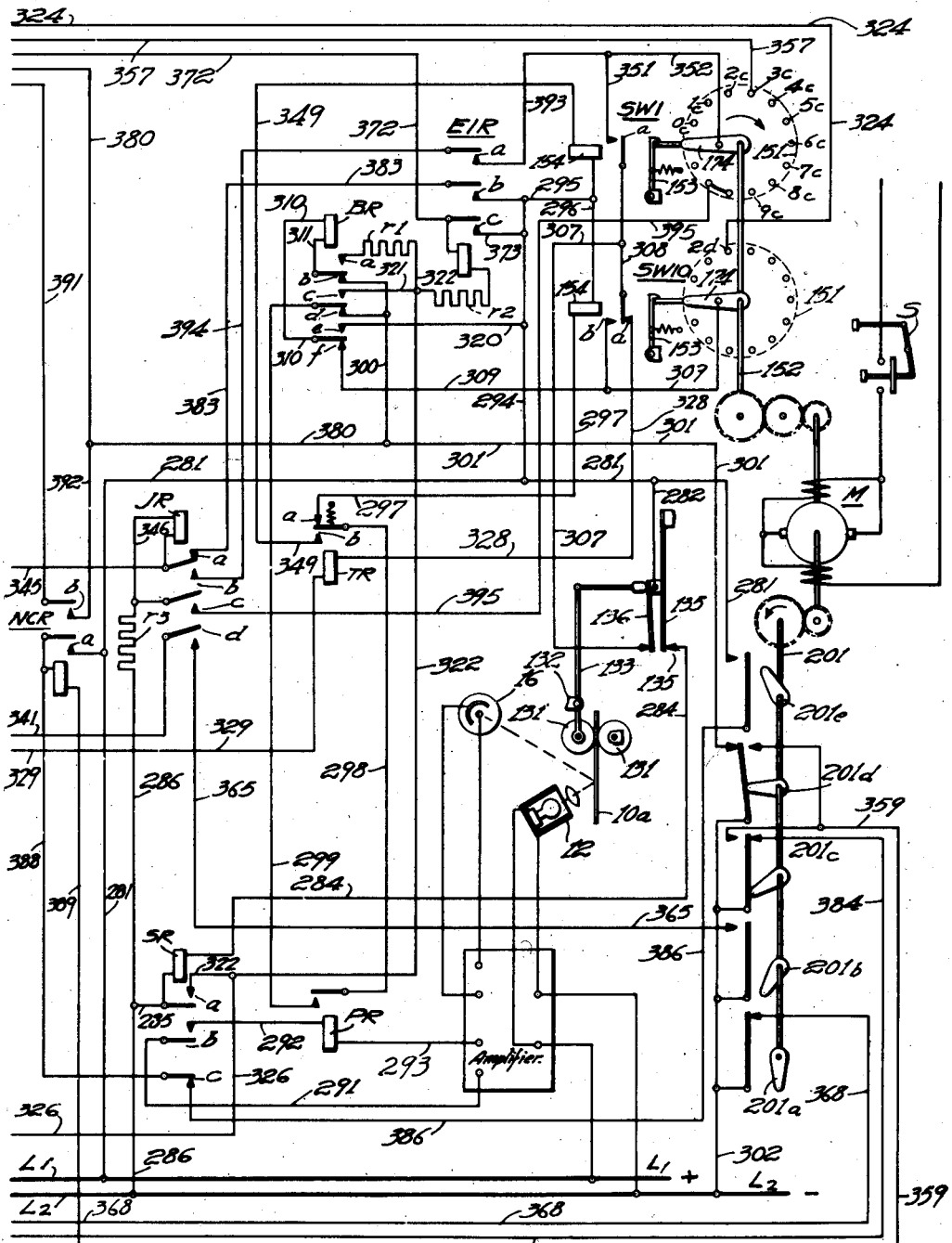

Fig. 26 is a view showing a postal billing card stub provided with coded marks suitable of controlling my card sorting machine; and Figs. 27, 28 and 29 are views diagrammatically representing the electrical circuits of my card sorting machine and the elements thereof. When the Sheets 10, 11 and 12 of the drawings are arranged in numerical order from left to right, and the various corresponding lines are extended across the margins between Figs. 27, 28 and 29 a complete wiring diagram will be obtained, and the operation of the system may be traced thereon.

Figure 1:
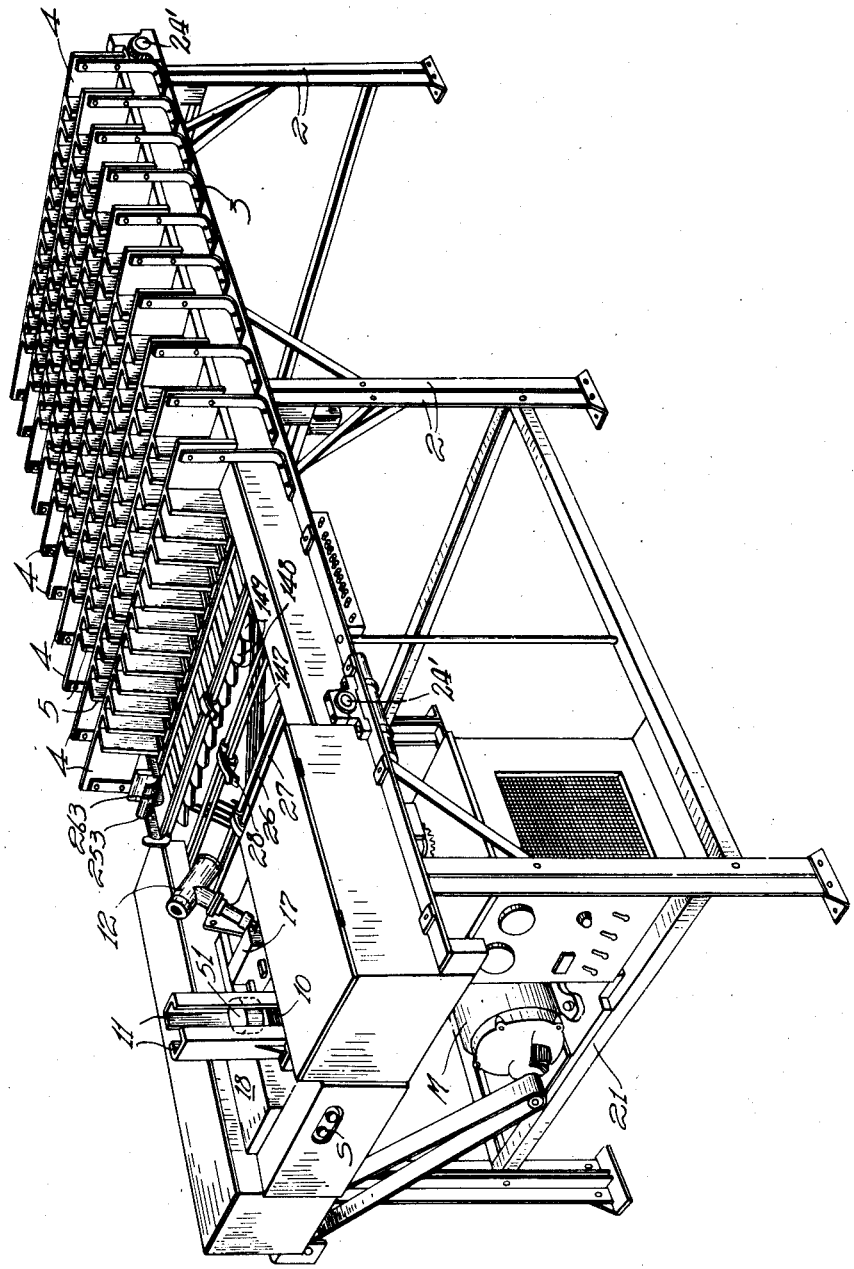
Figure 1 is a perspective view showing a completely assembled card sorting machine in accordance with the applicant's invention.
Figure 2:
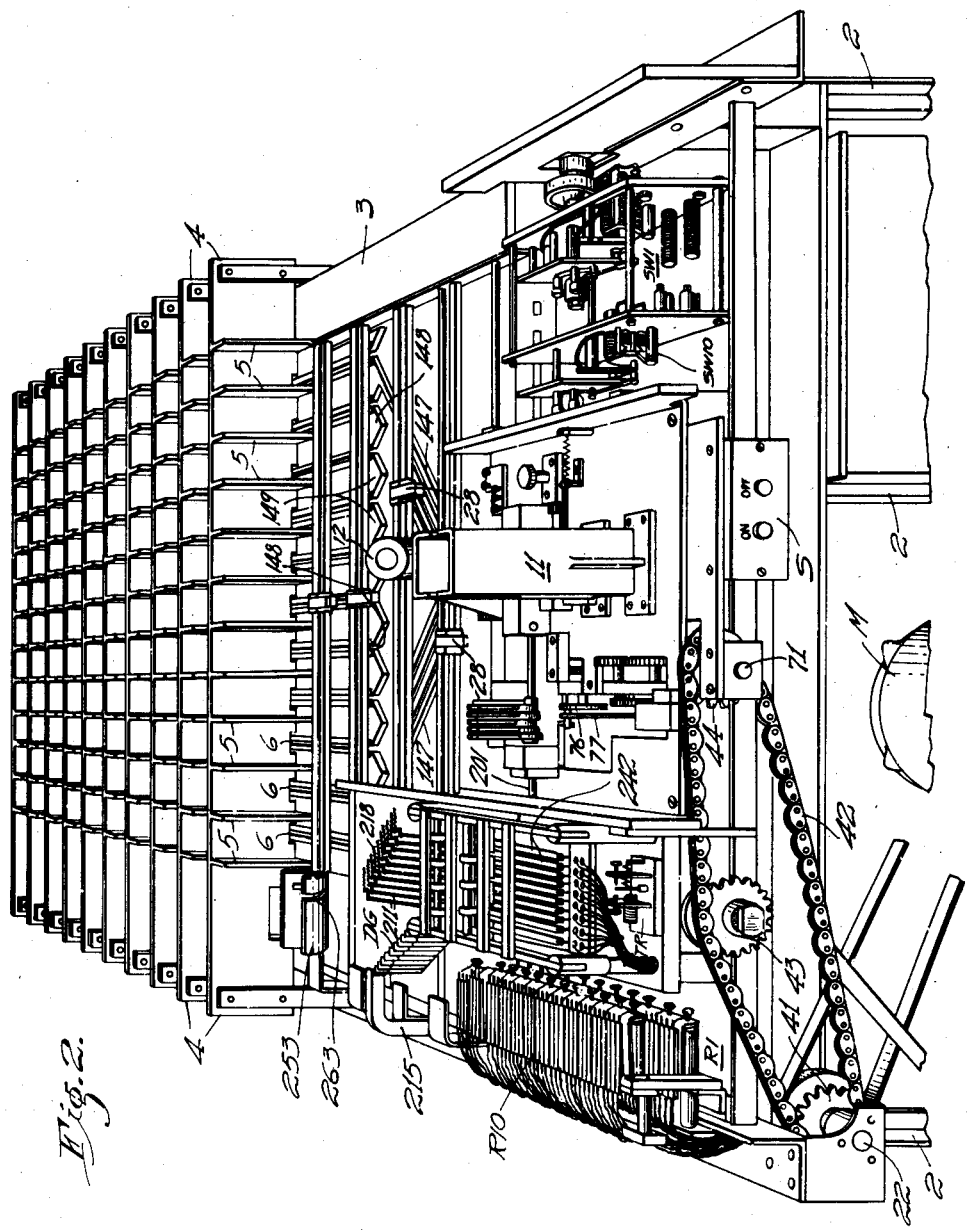
Fig. 2 is a perspective view of the card sorting machine with the enclosing casings and covers removed.

Referring more particularly to the drawings, the completely assembled apparatus is shown in Fig. 1, and also in Fig. 2, except that in the second view the covers and casings have been removed to show additional details which are normally enclosed.

The general assembly comprises a rigid table constructed of angle irons and structural steel members. The legs of the table are constructed of angle-irons 2 and the longitudinal supporting members 3 of the table mounted on the upper ends of the legs are also made of angle irons as shown in Figs. 4 and 22.

Card pockets are formed by laterally extending boards 4 provided with partition members 5 which are arranged to form pockets extending in rows both laterally and longitudinally to the back of the table whereby it is possible to provide a great number of pockets within a small space. A slot 6 is provided in the lower edge of the rear wall of each pocket to permit card clips to pass through.

A hopper for receiving a stack of cards 10 to be sorted is formed by vertical channel guides 11 mounted near the front of the table in opposed relation. A source of light 12 is mounted adjacent the card hopper on the table, and comprises a suitable casing enclosing a lamp and an optical system for projecting a sharply defined spot or beam of light which scans the cards as they are moved through the machine in a manner to be subsequently described.

A light sensitive photo-cell 16 is mounted adjacent the light source 12 to receive the reflected light from any card 10a which is being scanned. The relative positions of the lamp and photo-cell are most clearly shown in Fig. 3. A suitable cover 17, shown in Fig. 1, may be provided over the photo-cell to exclude extraneous light. The photo-cell is connected to a conventional amplifier, whereby the impulses set up by the varying light impinging on the photo-cell may be utilized to operate a relay.

To the right of the card hopper 11 and the light source are a pair of rotary selector switches 15 designated as the units and tens selectors SW1 and SW10 respectively. To the left of the card hopper 11 are various banks of relays R1 and R10, also mechanical gates DG and actuating means for controlling longitudinal distribution. A small casing 18 adjacent the card hopper encloses cam actuated contactors and control elements.

A manual switch S is provided on the end of the table adjacent the card hopper for starting and stopping an electric motor M, which is mounted on a shelf 21 under the table top and drives a worm shaft 22 extending longitudinally of the table. The worm shaft 22 drives worm wheels 23 and sprocket chain wheels 24 mounted on transverse axles 24' which drive a pair of endless sprocket chains 25, one on each side of the table. Carried by, and extending transversely between the sprocket chains 25, at equally spaced distances, are pairs of bars 26 and 27, as shown in Figs. 3 and 4.

One of each of said pairs of transverse members is a round rod 26 which pivotally and slidably supports a card clip 28 as shown more clearly in Figs. 4, 5 and 6. For this purpose a bracket 29 is slidably mounted on the round rod 26 and the card clip 28 is carried by a pivot pin 30 journalled between the end plates 31 and 31a of said bracket. A guide pin 32 projects downwardly from the bracket 29 for cooperative engagement with angularly disposed gates and guideways to shift the card clip laterally in a manner to be described subsequently.

The other transverse member is a square bar 27 and it carries a cam 33 which is associated with said card clip 28 to tilt the latter upwardly and deposit the card in its appropriate pocket, when a dog D also carried by the square rod 27 engages a stationary cam in a manner to be subsequently set forth. The cam 33 on the square rod is provided with a collar 34 which receives a laterally extending arm 35 projecting from one of the end plates 31 of the clip bracket 29 whereby the two are maintained in associated relation as they slide along their respective rod 26 and bar 27 toward either sprocket chain 25. Associated with sprocket chain wheels 24 are guide wheels 24a especially adapted to pass the portions of the chains 25 which support the spaced rods as shown in Fig. 6.

An auxiliary sprocket chain wheel 41 is also mounted directly upon the end of the worm shaft 22 and through a suitable sprocket chain 42 drives additional sprocket wheels 43 and 44 which in turn drive associated selector, cam and feed shafts.

The card feeding mechanism and its relation to the stack of cards 10 in the hopper 11 is most clearly shown in Fig. 7. The stack of cards to be sorted is placed in the hopper 11 and a weight 51 is placed thereon to effect a predetermined pressure between the lowermost card 10 and a separating roll 52 of soft live rubber. The separating roll 52 is journalled beneath the card hopper 11 in bearings 53 supported on a resilient arm 54 which may be vertically adjusted by turning a thumb screw 55 associated therewith.

At the lower left-hand side of the hopper, as shown in Fig. 7, a card separating knife 57 is pivotally mounted for elevating and separating the stack of cards 10 from the lowermost card when the latter is buckled back, as shown, by a reverse rotation of the rubber separating roll 52. The separating knife 57 is actuated by a cam 61, on a shaft 62, which also carries the lower one of the feeding rolls 63 and 63a. As the feed roller shaft 62 rotates, the cam 61 reacts upon a small roller 64 mounted on the end of a link 65 which is pivotally mounted to a crank 66 extending from the end of the knife. After the lower card has been buckled back and the knife 57 has been elevated to separate the remainder of the card stack therefrom, the roll 52 is turned in the reverse direction to eject the card through a channel 67 into the feed rolls 63.

The actuating mechanism for the separating knife and the rolls are more clearly shown in Fig. 8, from which it is apparent that a drive shaft 71 is driven by the sprocket chain 42 which is driven from the main worm shaft 22, as previously set forth. The feed roller shaft 62 also carries the lower feed rolls 63 and is driven from said drive shaft 71 through a suitable worm 73 and worm gear 74. Said feed shaft 62 also carries at one end thereof, the cam 61 which actuates the separating knife 57, and at the other end a pitman disc 76 which drives a pitman 77 to operate a planetary mechanism which in turn actuates the card separating roll 52.

The specific oscillatory planetary gear mechanism for driving the separating roll 52 from the feed roll shaft 62 comprises a combination gear-ratchet wheel 81 having external ratchet teeth and internal gear teeth. The gear-ratchet wheel 81 and a gear bracket 82 are journalled upon a shaft 83 for free rotatable movement relative thereto. The gear bracket 82 is of U-shape having both legs journalled on the shaft 83 as shown in Fig. 9. Pivotally journalled on the inner face of the gear bracket 82 are a pair of gears 84 having their teeth engageably received by the internal teeth of the gear-ratchet wheel 81. Between the gear bracket 82 and the gear-ratchet wheel 81 is a gear 85 which is secured rigidly to the shaft 83 by a key 86, and which has its teeth engageably received by both of the gears 84, as shown in Fig. 9. Adjacent the outer face of the gear bracket 81 is a ratchet wheel 87 keyed rigidly on the shaft 83. A pawl 88 is pivotally mounted on said gear bracket with its pointed end in engageable relation to the teeth of said ratchet wheel. The other end of said pawl 88 is pivotally connected by a pin 89 to the pitman 77. The end of the pin 89 extends into an open slot 94 in the end of the gear bracket 82.

A second pawl 95 is pivotally supported by a stationary pivot 96 in engageable relation to the ratchet teeth on the outer rim of the gear-ratchet wheel 81. A tensioned helical spring 97 biases the pawl 95 away from the ratchet teeth. A laterally extending arm on the pawl carries a flat resilient spring 98 which is curved at its free end to slidably engage the back of the first pawl 88 and which by its reaction tends to hold both pawls in engaging relation with their associated ratchet teeth. The separating roll 52 is carried by a separating shaft 99 which also carries, rigidly keyed thereto, a gear 101 which engages a second gear 102 rigidly keyed on the shaft 83.

In operation an oscillatory movement is transmitted through the pitman 77 to the pawl 88. When the pitman 77 moves to the right it tilts the pawl 88 in a counter-clockwise direction, thus causing it to engage with and rotate the ratchet wheel 87. At the same time, the motion releases the secondary pawl 95 and permits it to be pulled out of mesh with the teeth on the ratchet-gear wheel 81 by the tension spring 97. The engagement of the pawl 88 with the ratchet wheel 87 causes it to be rotated in a counter-clockwise direction at slow speed. This motion is transmitted through shaft 83, gears 102, 101 and shaft 99 to the separating roll 52 which is driven clockwise at slow speed.

The friction between the lowermost card or document of the stack and the rubber separating roll 52 causes it to buckle back as shown. This clockwise motion of the separating roll is continued only far enough to buckle the document slightly and separate it from the stack. At the same time the separating knife 57 is elevated by the cam 61 on the feed roll shaft 62, and lifts the remainder of the stack. While the stack is held in the elevated position the separating roll 52 is given a rotation at high speed in the counter-clockwise direction which ejects the bottom card or document under the separating knife 57, through the card channel 67 and into the feed rollers 63.

The high speed rotation of the separating roll 52 in the counter-clockwise direction for ejecting the card is imparted when the pitman 77 moves to the left. As the pitman moves to the left, the pawl 88 tilts clockwise thereby disengaging from pawl wheel 87 and at the same time rotating the second pawl 95 into latching engagement with the ratchet teeth on the gear-ratchet wheel 81 which is thereby held stationary. The continued movement of the pitman to the left eventually takes up all the slack motion between the pin 89 and the slot 94 in the end of the gear bracket 82 which is then rotated clockwise. Since the pivot pins of the gears 84 are supported by the gear bracket 82 they are also carried in a clockwise direction and the gears 84 are caused to rotate by their engagement with the internal gear teeth on the locked ratchet-gear wheel 81. The rotation of the gears 84 causes the gear 85 to rotate at high speed in a clockwise direction, and since the latter is keyed to shaft 83 it is also rotated. This motion transmitted through gears 102, 101 and shaft 99 turns the rubber separating roll 52 in a counter-clockwise direction at high speed.

The gears 84 and 85 are so related that the counter-clockwise rotation of the separating roll 52 is great enough to eject the card under the separating knife and into the feed rolls, but when directly connected for motion in the clockwise direction the motion is only great enough to move the front edge of the card clear of the separating knife or lifter.

In order to ensure that the card enters the feed rollers 63 precisely at the instant when they have a certain predetermined angular position, a stop timer 105 is pivotally mounted beneath the path of the card and, as shown in Fig. 10, it is provided with an upturned end portion for engaging and holding the card. The lower feed rollers 63 are made in two sections thereby providing a space between for the operation of the pivoted timer stop 105 which engages the end of the card. The lower feed rollers 63 are provided with a depressed area 107 which does not grip the card firmly, and the card is not positively drawn forward until engaged by the raised area 108 of the roll which does not occur until the card is released by the timer stop 105. For controlling the operation of the timer stop a cam 109 is mounted on the feed roll shaft 62 between the two sections of the roll and it presents a slightly inclined surface for lifting the stop gradually to its card stopping position, and an abrupt depression for permitting the stop to drop suddenly and release the card the instant the feed roller 63 arrives at the proper angular position.

A biasing spring 110 may be provided to insure prompt retraction of the stop when the abrupt depression of the cam passes thereunder. A separate bearing element 111 may be secured to the stop member for slidably engaging the surface of the cam 109.

Mounted on the side of the card hopper adjacent the feed rolls is a bracket 121 which affords a guide bearing for a squaring bar 122 which is slidably mounted therein, as shown in Fig. 3. Depending vertically from one end of said slidable bar is a rod 123 which is turned horizontally at its lower end to provide a hub for supporting a small roller 124 which is arranged to roll on the side of a cam 125 carried by the feed roll shaft 62. Vertically depending from the other end of the bar is a squaring finger 126 which extends adjacent the side edge of a card as it is passed through the feed rolls 63.

A spring 127 continuously biases the slidable squaring bar 122 to move the finger 126 against the edge of the card 10a, but its movement in this direction is limited by the roller 124 and cam 125. The configuration of the cam surface is such that after the front edge of the card has passed the finger 126, the bar is permitted to slide forward and press the finger lightly against the side edge of the card by the tension of the spring. The card continues to pass through the feed rolls 63 unaffected by the finger so long as it is gripped firmly. However, when the short depressed area 107 on the lower feed roll 63 arrives opposite the upper feed roll the card is released for an instant. The pressure applied on the edge of the card by the finger 126 is then effective to shift the card a predetermined amount, as limited by a suitable guide, thereby ensuring that the card is accurately aligned to carry the black code marks under the light beam for scanning.

The feed rolls again grip the card and thrust it between the scanning rolls 131. The upper scanning roll 131, as shown in Figs. 3 and 29, is journalled in the end of a pivotally mounted bracket 132 which is connected by a link rod 133 to a contactor mechanism. If a normal card passes between the scanning rolls, the upper one is lifted, by the thickness of the card, and tilts the pivoted bracket 132. The associated contactor is thereby actuated to close its upper contacts 135 and complete the amplifier and relay circuits.

If two cards enter the scanning rolls together, the upper roller 131 will be moved a greater amount and the upper card contacts 135 will be closed as above set forth, but the lower contacts 136 will be opened thereby preventing the actuation of the relays to distribute the cards, which instead are delivered to a rejection pocket in a manner to be subsequently set forth.

In Figs. 11 and 12, I have illustrated mechanical gates which control the lateral distribution of the cards as they are carried by the card holders. As each card is carried along by its card clip, the downwardly projecting guide pin 32 of the latter passes between two rows of the gates which are pivotally mounted. As shown in Fig. 12, each gate comprises a gate vane 141 secured to the head of a pin 142 which is vertically pivoted in the distributing deck 143 of the table.

The lower end of each pin 142 is provided with a crank 144 secured thereon in any suitable manner. A suitable connecting rod 145 is secured to each crank and extends to an electromagnet 146 which, when energized, actuates the crank 144 and rotates the gate to deflect the guide pin 32 laterally as it passes along the direction indicated by the arrow. One gate is shown in its actuated position, in Fig. 11, and an associated angular guide channel 147c is thereby opened to receive the guide pin 32 which will thereby be moved laterally until the end of the guide channel is reached. The guide channels 147c are defined by guide strips 147 secured to the distributing deck 143.

As shown in Fig. 3, each one of the angular guide channels 147c terminates in line with a respective longitudinal guide-channel 148 corresponding to one of the longitudinal rows of card pockets. The longitudinal channels 148 are separated by triangular guide blocks 149. The gates 141 are positioned adjacent the center line of the machine in order to be in line with the scanning rolls whereby each card clip 28 will enter directly therein as soon as it receives its card. If the card is a blank or is improperly marked, it is permitted to pass straight through the corresponding longitudinal channel 148 to a rejection pocket.

A separate electromagnetic actuating means 146 is provided for each gate. The energization of the electromagnets 146 is controlled by the selector switches in such a manner that the actuation of a selected gate does not occur until the corresponding card approaches, and it is promptly reset thereafter, as will be subsequently set forth.

The selector switches SW1 and SW10, previously referred to, are shown diagrammatically in Fig. 3. Each selector comprises a brush wheel 151 which is driven through a friction slip clutch from a common shaft 152 which rotates continuously while the machine is operating. To hold the brush wheels normally stationary a latch 153 is mounted adjacent each one. Associated electromagnetic means 154 is provided whereby the latch may be moved to ineffective position to permit the contact arm to rotate.

The structural details of one of the selector switches are more specifically shown in Figs. 13, 14 and 15 wherein it may be seen that a sleeve 157 and a clutch collar 158 are keyed rigidly to the continuously rotating shaft 152 by a pin 159 whereby the sleeve and collar will rotate therewith. The outer extremity of the sleeve 157 is threaded and receives a threaded clutch collar 161 which is locked thereto by a set screw 162 and hence also rotates with the shaft. The brush wheel 151 is mounted on a bearing block 167 which is journalled to rotate relatively free on said sleeve 157. Each clutch collar is provided with a dished resilient member 168 turned in toward the bearing block 167 which is pressed therebetween. In order to minimize wear, and to insure a smooth frictional force between the sleeve and the bearing block journalled thereon, a lubricant receiving conduit 169 is provided on the latter.

A spring pressed brush 174 is carried by the brush wheel 151 for slidable movement over a series of stationary stud contacts c mounted on an insulating plate 175 supported by a bracket 176 extending from the end plate 177. A suitable bearing block 178 for supporting the end of the rotating shaft 152 is also supported by the end plate 177 and is also provided with suitable lubricant receiving means 181. A resilient biasing member 182 supported on the end plate 177 continuously reacts on the end of the shaft 152. The pivoted latch 153 is adjacent the frictionally mounted brush wheel 151 and engages a detent or arm 186 associated with the brush wheel 151 to prevent the latter rotating with the shaft. The position of the latch 153 is controlled by an electromagnet 154 through a pivoted armature 188, biasing springs 189, an actuating arm 191 and a link 192 which is connected to the latch. Contact members "a" are associated with the electromagnet for actuation simultaneously therewith. Both selector switches are similar except that an additional contact member is provided on the one designated as SW10 in Fig. 29.

The bank of cam actuated contactors, previously referred to, is most clearly shown in Fig. 21, and consists of a plurality of sets of contactors one of which is associated with each of a plurality of cams 201a, 201b, 201c and 201d carried by a shaft 201 which rotates continuously. Each set of contactors comprises a resilient actuator strip 202 disposed for direct engagement by the cam. A piece of insulation 203 is secured on the end of the actuator strip to engage the end of an elongated resilient contact member 204. A short contact member 205 is disposed on each side of the elongated contact member and each is provided with a point of suitable contact material for engaging a corresponding contact point on the long strip. As the cam engages the actuator strip 202 the latter forces the elongated contact member 204 away from the adjacent or back contact member and into engagement with the short contact member on the opposite side which will be referred to as the front contact member. Suitable clamps 206 of insulating material are provided with bolts 207 for supporting the resilient actuator and contact strips in cooperative relation. In general the arrangement of each set of contactors is similar but all contactors associated with each cam are not utilized in the relay circuits. By reference to Fig. 29 it will be seen that all the contactors are utilized only in the sets associated with cams 201c and 201d. In the sets associated with cams 201b and 201e only the normally open front contacts are utilized, and in the set associated with cam 201a, only the normally closed back contacts are utilized. The individual cams for actuating the various sets of contactors are mounted in predetermined angular relation on the single shaft 201 which is driven continuously in predetermined phase relation to the feeding and scanning mechanism while the machine is operating.

The longitudinal destination of a card carried by a clip is determined by tilting the card clip 28 upwardly as it approaches any selected pocket so that it will deposit its card in that particular pocket instead of passing freely thereunder, as previously set forth with reference to the card holder disclosed in Figs. 5 and 6. This movement is accomplished by rotating the square transverse bar 27 to turn the cam 33 under the card clip, and each square bar 27 carries a slidably mounted dog D for controlling its operation. The full length of one of the transverse carrier bars 27 carrying a cam 33 and a dog D slidably mounted thereon is clearly shown in Figs. 3 and 4.

The position of the dog D on the bar 27 predetermines the longitudinal position at which the card will be deposited, and the position of each dog is controlled as it passes through the angularly disposed gates DG shown in Fig. 16. The lower portion of each gate is provided with a smooth beveled face, as shown in Figs. 17 through 20, and together the gates normally present a smooth angularly inclined surface which slidably diverts each dog toward the end of its transverse carrier bar adjacent the sprocket chain as the bar is carried along by the chain in the direction represented by the arrow.

When any gate is selected for operation, it is moved aside by its actuator, and an opening is created through which the dog passes.

Referring to Figs. 18 and 20, the left hand side of the forwardly projecting portion of each gate is bevelled from the upper edge thereof to provide an undercut surface which, upon movement of the actuator rod 213, rides upon the right hand edge of the adjacent gate. The forward face of the gate over which the dog D normally slides, is similarly bevelled to ride over the edge of the forward face of the adjacent gate.

Two sets of gate actuators are shown in Fig. 16, one set being shown in normal position, and the other set in actuated position with the associated gate opened. Each gate DG is supported on the end of a connecting bar 211 which is interconnected between the gate and an actuating crank 212, and which extends through a guide slot 213 supported on bracket 215. The connector 211 may be of rectangular cross-section and is rigidly secured, in any suitable manner, in a slot 214 in the head of the gate member. The actuating crank is supported on a shaft 216 carrying a bell crank 217, one arm of which is connected to a tension spring 218 which normally biases the gate DG to closed position. A connecting link 219 extends from the other arm of the bell-crank 217 to a hook bar 220 having a slot 221 by which it is slidably supported on a rod 222.

Each tension spring 218 normally holds the associated hook bar 220 in retracted position where it is so balanced that in this position the hook 223 on the end of the bar 220 swings upwardly. An actuator rod 231 extends to the armature 232 of an electromagnet 233 by which the hook 223 may be depressed. The energization of the electromagnets is controlled by a selector switch in accordance with the indicia on the cards.

A second hook bar 242 is also slidably supported by a pin and slot arrangement and is so disposed that its hook 243 is adjacent the first hook. A biasing spring 244 normally biases the second hook to an advanced position. To the remote end of the second hook bar a beam 245 is pivotally connected. A beam shaft 246 pivotally supports the beam with its free end in engageable relation to a cam shaft 247 which is continuously driven from the machine. One beam shaft 246 serves to support all the beams, of which there is one for each gate. It is to be understood that there is also a set of actuating mechanism for each gate, although for clearness, only two are shown. The cam shaft is provided with a plurality of cams arranged in progressive angular sequence for operating the beams and rotates continuously while the machine is in operation. Separator guide rings 248 are provided on the shaft for maintaining the end of each cam beam 245 in engagement with its individual cam.

As the cam shaft 247 rotates, each beam 245 is held firmly in contact with its cam by its biasing spring 244 and it is driven by the cam with an oscillatory motion. The upper end of the beam imparts a motion of reciprocation to the associated hook bar 242 which, as above set forth, is pivotally connected thereto and is slidably mounted. As it oscillates, the hook 243 on the end of the reciprocating hook bar passes freely under the hook 223 on the end of the stationary hook bar which, as previously set forth, is normally in elevated position. If, however, any electromagnet 233 is energized by the selector switch, the associated stationary hook 223 will be lowered into engaging relation with its oscillating hook bar which will then pull it forward thereby rotating the bell-crank 217 and pushing the slidable connecting bar 211 to open the corresponding dog gate DG.

The cams on the cam shaft 247 are so positioned, and the rotation of the cam shaft is so timed with relation to the movement of the sprocket chains 25 that any particular cam will effect the operation of the associated dog gate DG at the instant when the dog D, sliding along the inclined gate faces, approaches that particular gate. Hence, the dog promptly passes through the gate before it, and its lateral position on the transverse carrier bar 27 is determined. The gate is released promptly thereafter and is closed by the tension spring 218 associated therewith and is ready to adjust the position of the next dog as it approaches.

As the transverse carrier bar 27 moves along through the machine the laterally extending arms of the dogs D are carried between tracks 252, shown most clearly in Figs. 16, 22, 23 and 24, which correspond to the respective gates. As the dogs D are moved along between their respective selected tracks 252 various stationary cams are engaged by the arms which extend laterally from the dog, as shown in Fig. 23. The bars 27 move in the direction indicated by the arrow and pass under an upper cam 253 mounted above the bars which is so wide that it will engage the upturned arm of each dog irrespective of its lateral position on the bar. The first dog D from the left is shown engaging the upper cam 253. After passing under this cam the dogs are turned down to the position represented by the third dog from the left, and the card clips are also turned down in such a position that they will pass freely under the pockets. The dogs remain in this position and, as they are carried along the machine, the downwardly projecting arm of the dog subsequently engages a lower cam 254.

There is one lower cam 254 for each lateral row of pockets and, as shown in Fig. 24, they are disposed between individual guide tracks 252 whereby each cam will be engaged only by the particular dog which has been moved into alignment therewith. As shown, in Fig. 23 the second dog from the left is engaging a lower cam 254 with which it has been previously aligned by the gates. As the dog is carried along by the transverse bar 27 the lower cam with which it is engaged turns it up to the position represented by the fourth dog from the left. This turns the card clip 28 up, as shown, to such a position that it will pass through and deposit its card in the bottom of the pocket.

In Fig. 5, the uppermost card holder 28 has been represented in elevated card depositing position as it passes through a pocket. It will be apparent that the card holder slides under the stack of cards in the pocket and passes freely through the slot in the rear wall of the pocket. The card in the holder being wider than the slot, engages the rear wall and is deposited in the pocket at the bottom of the stack.

After any card holder has passed through a pocket and deposited its card, the upturned arm of the associated dog engages another upper cam 255 which again turns it down, as represented by the third dog from the left in Fig. 23. This lowers the card holder 28 so that it will pass freely under the remaining card pockets without engaging the stack of cards in every pocket as it moves to the rear of the machine. For this purpose an upper cam 255 is provided slightly behind each lateral row of pockets.

In order that the slidable dogs D may be reset to a definite distance from the end of the transverse carrier bars 27, a guide rail 261 is angularly mounted under the machine, as shown in Fig. 25. As the bars are carried along by the under sides of the sprocket chains 25 on their return trip, they are deflected inwardly by said guide rail 261 which is inclined at a slight angle to the axis of the machine. This operation resets the dogs so they will be in a proper lateral position for engaging the selecting gates. It is also necessary that they be turned up before approaching the dog gates and this is accomplished by a cam 262 (Fig. 23) which engages all the dogs after they pass upwardly over the sprocket wheel 24 at the end of the machine. After passing this cam each dog is in the proper position for engaging the deflecting gates which determine their lateral displacements on their respective carrier bars and they are ready to repeat the cycle.

It is to be noted, however, that when approaching the broad upper cam 253 which turns the dogs down, those particular dogs which have been set for depositing a card in the first lateral row of pockets do not engage the cam but pass freely through a slot 263 therein. This is clearly shown in Fig. 2. It is therefore unnecessary to have a lower cam 254 for turning the dogs up for this row of pockets, and the card holder 28 approaches the first row of pockets in upturned position without being first turned down and then up as the pocket is approached.

It is also necessary to reset the slidable card holders 28 to the center of the transverse carrier bars 26 in line with the card scanning rolls for receiving the card after it has been scanned. This operation is also accomplished as the bars return along the under side of the machine. For this purpose a pair of guide rails 265 are mounted in such a position on the bottom of the machine that, as shown in Fig. 25, they converge angularly toward the center thereof. As the card holders move along under the machine they are engaged by the angular guide bars 265 which slide them to the center of the machine and they are ready to repeat the cycle.

As previously stated, the machine was especially designed for sorting bill stubs for power companies. The stubs are torn or cut from one end of standard post cards on which the original bills are printed and mailed, and they are approximately three and one-fourth by one and three-fourths inches in size. These are returned to the company by the customer when he pays his bills, and since they serve as a record of payment of the bill they must be sorted for filing.

Since the cards to be sorted have passed through the mail they are in various stages of wear and tear and are not in the perfect condition necessary for sortment by the usual sorting machines. The exceptionally difficult requirements of this application led to the use of the photo-electric principle and a unique feed mechanism.

The cards to be sorted are provided with code marks which bear a definite relation to the original data on the card and which may be marked thereon at the same time. There are four such marks arranged in line across the card as shown in Fig. 26. The photo-cell controls a relay system such that the impulses set up by the first and second marks respectively start and stop a tens selector switch, and the impulses set up by the third and fourth marks respectively start and stop a second selector. Hence the time that a selector runs depends upon the spacing of the marks on the card.

It is apparent, however, that the applicant's machine may be utilized for sorting any cards or papers desired, by merely providing suitable coded indicia thereon. Furthermore, it is within the scope of the applicant's invention to substitute any equivalent coded indicia for controlling the sorting machine and to substitute other card searching means than the photo-electric means disclosed since many features of the selecting and distribution system are useful irrespective of the specific indicia and scanning means used.

In Fig. 27 of the wiring diagram, a bank of relays is represented which is referred to collectively as the units group R1, the individual relays of which correspond to the numerals from 0 to 9 and which are accordingly designated individually as relays 0R1 to 9R1. This group of relays controls the selection of the particular dog gate electromagnet of the group DGE to actuate the proper gate DG and determine the proper longitudinal delivery of the cards. Since the dog gate electromagnets likewise correspond respectively to the digits from 0 to 9, they are individually designated by reference characters 0DGE to 9DGE, respectively. The positive and the negative main line conductors are designated L1 and L2, respectively.

In Fig. 28, a bank of relays is represented which is referred to collectively as the tens group R10, and which are designated individually by reference characters 0R10 to 90R10. Each one of this group of relays controls the selection of a lateral gate actuating electromagnet from a group LG which determines the lateral delivery of the card. The lateral gate actuating electromagnets are individually designated by reference characters 0LG10 to 90LG10 since they correspond to numerals 0 to 90 by tens.

With this arrangement, it is possible by energizing the proper gate electromagnets in groups DGE and LG to deliver a card to any one of a plurality of pockets numbered 0 to 100. Each gate electromagnet of both groups is also provided with contacts which are simultaneously actuated.

In Fig. 29, the various elements, for controlling the setup of relays as the card is scanned, are diagrammatically represented in associated relation.

The diagrammatically represented motor M is preferably a compound motor having a good speed characteristic, and it is controlled by a manually actuable switch S. In operation the motor continuously drives various parts of the machine as previously set forth, but in Fig. 29, I have only shown those elements driven by the motor which effect the electrical circuits. As shown, the shaft 201 drives the cams 201a to 201e to actuate the various associated contactors of the cam commutator previously disclosed in detail, and serves to properly time the operation of the various relays and to reset them thereafter. The selector switches previously described in detail are diagrammatically represented at SW1 and SW10 in frictional engaging relation to an associated shaft 152 which is continuously driven by the motor M.

A card 10a is represented in cooperative relation with a pair of scanning rollers 131, and the card contacts 135 and 136 are shown associated therewith, whereby they will be actuated in accordance with the thickness of the card. When there is no card in the rollers, contact 136 is engaged and contact 135 is open. When a card of normal thickness enters, contact 135 closes, and 136 remains closed. When a card of unusual thickness, or two cards together, enter the rollers, the contact 135 will close and contact 136 will open.

The source of light 12, as previously set forth, comprises an optical system for directing a beam of light of high intensity upon the card 10a as it moves adjacent thereto. A photo-cell 16 is disposed adjacent the card to receive the light reflected therefrom, and both the source of light 30 and the photo-cell may be shielded in any suitable manner. The photo-cell 16 is connected to the input terminals of an amplifier which may be any well known amplifier suitable for use with light-sensitive cells in the well known manner, and the source of light 12 and the amplifier may be both energized directly from the main line conductors L1 and L2. The output of the amplifier is connected through a primary relay PR which, in the normal operation of the device, is energized by impulses therefrom in accordance with the code marks on the card being scanned.

A starting relay SR is provided which is actuated by the card contacts and which renders the relay system operative to respond to impulses from the scanner. Other elements of the system comprise a transfer relay TR, a branch relay BR, a justifying relay JR, an extra impulse relay and a no card relay NCR.

In its complete assembly, my card sorting machine provides not only for the expeditious sorting of a plurality of cards under normal conditions, but it is also provided with means for preventing the erroneous distribution of torn, frayed or irregular cards, cards sticking together, blank cards accidentally mixed with cards to be sorted, cards having insufficient number of marks thereon, cards having too great a number of marks thereon and many other conditions.

My invention is best understood, however, when considered with reference to an assumed operation thereof, tracing a card through the machine to its destination.

To sort cards with the machine, the operator will place a stack of cards 10 to be sorted in the card hopper 11 and will place the weight 51 on top of the stack to maintain a predetermined pressure between the bottom card and the separating roll 52. He will then close the main switch S, shown diagrammatically in Fig. 29 of the wiring diagram, to start the motor M. As previously set forth, the motor operates to continuously drive the sprocket chains which carry the card holders. Likewise the contactor cam shaft 201, the selector switch shaft 152, the dog gate actuator cams, and the separating, feeding and scanning rolls are continuously driven by the motor.

As previously set forth in detail, the separating and feeding mechanism operates to feed the cards from the bottom of the stack, one by one, and passes them into the feeding rolls 63 where, after being accurately timed and squared, they are fed into the scanner.

As a card enters the scanning rollers 131, the upper roller is lifted thereby causing the lower card contactor 135 to be engaged, as previously explained. The closure of the contacts 135 energizes the starting relay SR which completes a circuit from the output of the amplifier through the coil of the primary relay PR, and thereby renders the system operative for scanning the card, and setting up the supervisory relays for controlling the gates to distribute the card according to the code marks thereon.

The circuit completed for the starting relay by the card contact extends from the main line conductor L1 by way of conductors 281, 282, the card contacts 135, thence by way of conductor 284 through relay coil SR, and by conductors 285 and 286 to the other main line conductor L2.

The starting relay SR being energized draws up its armature closing its front contact members a, b and opening back contact members c. The closure of its contact members b completes a circuit from an output terminal of the amplifier through a conductor 291, contact members b of the starting relay SR, thence by conductor 292, through the coil of the primary relay PR, and through conductor 293 to the other output terminal of the amplifier.

As the card passes under the scanning beam, the variation of the light reflected from the card by the first code mark affects the photo-cell 16 and amplifier to set up an impulse which actuates the primary relay PR which momentarily energizes the latch releasing coil 154 of the selector switch SW10.

The circuit completed through the releasing coil of the selector switch SW10 may be traced from the positive main line conductor L1, through conductors 281, 294, 295, 296 to the releasing coil of SW10, thence by way of conductor 297 through the back contact members a of the transfer relay TR, through conductor 298, the contact members of the primary relay PR, conductor 299, the lower center contact d of the blank relay BR, conductors 300, 301, front cam 201d, thence by way of conductor 302 to the negative line conductor L2.

As the releasing coil on selector switch SW10 is energized, the brush wheel 151 is released and starts to rotate around the stationary stud contacts but does not energize the relays connected thereto. Since the shaft 152 is driven by the same mechanism as the scanning rolls, as previously set forth, the brush wheel 151 rotates in synchronism with the motion of the card 10a.

In addition to moving the latch 153 to releasing position, the releasing coil also momentarily actuates the contactor on the selector switch SW10 to close its contact b and energize the coil of the blank relay BR.

The circuit by which the relay BR is energized may be traced from main line conductor L2 through conductors 281, 282, the resilient card contact strip to stationary contact 136, thence by way of conductors 307, 308 through front contact b on the selector switch SW10, through conductor 309, back contact f of relay BR, and through conductor 310 to the coil of the relay BR, thence through conductor 311, back contact b of relay BR to conductors 300, 301 and through the cam 201d, front contacts and conductor 302 to the other main line conductor L2.

As the coil of the relay is energized, it pulls up its contacts and opens the back contacts b and f thereby interrupting its primary energizing circuit. A holding circuit is completed, however, through the front contacts a and e which maintains the energization of the coil. The relay is so arranged by the use of flexible and slack motion contacts that the front contacts a and e will be closed before its back contacts b and f are opened. The holding circuit which relay BR completes for itself extends from line conductor L1 through conductors 281, 294, 320 and contact e, conductor 310, coil of relay BR, conductor 311, contact a, resistor r1, conductor 322, contact a on relay SR and conductors 285 and 286 to conductor L2.

The passage of the second code mark under the light creates an impulse which actuates the primary relay PR to again close its contacts, and reenergize the coil of said tens selector switch SW10.

The circuit through which the coil of selector SW10 is energized by the second impulse is different than that through which the first energization was accomplished. This circuit extends from the main line conductor L1, through conductors 281, 294, 295 and 296 to the coil which is energized, and thence by way of conductor 297, back contact a of the transfer relay TR, conductor 298, the contacts of primary relay PR, conductor 299, upper center contacts c of the blank relay BR, conductors 321 and 322, back contact a of starting relay SR, and through conductors 285 and 286 to the other main line conductor L2.

At the instant that the coil of the tens selector SW10 is reenergized and pulls up engaging its front contact b, its brush will be on the stud contact corresponding to the code on the card, which is assumed to be stud contact 2d, and its momentary energization will excite the corresponding supervisory relay of the tens group. The relay connected to the 2d stud contact on the selector is the twenties relay 20R10, which is the one that is energized in the example given.

The circuit completed for the twenties relay 20R10 of the tens group extends from main line conductor L1 by way of conductors 281 and 282 through the card contacts 136 thence by way of conductors 307 and 308 to the front contact b of the tens selectors SW10, continuing by way of conductor 309 to the rotating brush 174 of the selector, thence by way of stud contact 2d (assuming this to be the contact engaged at this particular instant) through the conductor 324 to the twenties relay 20R10 in the R10 bank, thence by way of conductors 325, 326 and 322 through front contacts a of starting relay SR and conductors 285 and 286 to the other main line conductor L2.

The energization of the twenties relay 20R10 pulls up its contactors. The stationary front contact a is engaged by its movable contactor and completes a stick circuit for the relay coil which extends through conductors 327 and the back contacts of the tens and the zero relays, which are not energized, to the main line conductor L1. At the same time, the back contact b is disengaged and opens the circuit previously extended to all the other relays of the group through conductor 327 whereby they are locked out.

The actuation of this, or any relay of the tens group, connects one side of the coil of the transfer relay TR to the main line conductor L2 and as soon as the coil of the selector SW10 is deenergized, the back contact a thereof is closed thereby connecting the other side of the transfer coil to the other line conductor L1. This causes the transfer relay TR to pull up thereby moving its contactor from the back contact to the front contact, and switching the primary relay circuit from the tens selector SW10 to the units selector SW1.

The circuit whereby the transfer relay was energized through the twenties relay 20R10 and the selector contacts may be traced from main line conductor L1 through conductors 281 and 282, card contacts 136, conductors 307 and 308, back contact a of selector SW10, conductor 328, the coil of the transfer relay TR, thence by way of conductors 329, 330 and 331 through contacts d of the twenties relay 20R10 and by way of conductors 332 and 333 to the other line conductor L2.

The closure of the center contact c of the twenties relay 20R10 prepares a circuit for the lateral gate electromagnet 20LG10 (corresponding to one of the electromagnets 146 in Fig. 12) which controls the gate vane 141 for shifting the card holder laterally into alignment with the third horizontal row of card pockets.

The circuit prepared for the lateral gate electromagnet 20LG10 may be traced from the main line conductor L1 through conductors 336 and 337 to the electromagnet, thence along conductor 338 through the contacts c of the twenties relay 20R10, thence by way of conductors 339, 340 and 341 to the back contacts d of the justifying relay JR which are open.

It is apparent that the circuit for the twenties relay is prepared only as far as the back contacts d of the justifying relay which are open, the justifying relay being normally energized. The circuit which is normally completed through the justifying relay extends from main line conductor L1 through conductor 344 and the back contacts b of the units relays thence through conductor 345 through the coil of relay JR and by way of conductor 346, resistor r3, and conductor 286 to the other main line conductor L2. It is not until one of the units relays is energized, thereby opening back contacts b, that the justifying relay is deenergized and closes its back contacts d to complete a circuit from the tens relay to the cam contacts as will be subsequently set forth.

This completes the set up of the tens digit which in the case assumed was twenty.

The third code mark on the card next absorbs the light, and the primary relay contacts are again closed. This energizes the releasing coil of the units selector SW1 through a circuit similar to that previously traced for the coil of the tens selector except that, the operation of the transfer relay TR has switched the circuit through its front contact b, and the inter-connected conductor 349 to the coil of selector SW1.

The releasing coil of selector SW1 momentarily pulls up its latch thereby releasing the brush wheel which runs around the associated stud contacts in synchronism with the motion of the card 10a in the scanner. Simultaneously the contacts a are closed completing a circuit to energize the rotating brush. This circuit extends from main line conductor L1 through conductors 281 and 282, card contacts 136, conductors 307 and 308, contact a of the selector SW1, and conductors 351 and 352 to the rotating brush. Since the contact a and the latch 153 on the selector SW1 are only pulled up momentarily the contact again opens the circuit to the brush before it has moved far enough to engage any of the stud contacts c, and this energization of the rotating brush has no effect.

The fourth code mark on the card again operates the primary relay PR and momentarily energizes the coil of the selector switch SW1. This again closes front contacts a and energizes the rotating brush 174 momentarily. Since it is now in engagement with the particular stud contact 3c which corresponds to the code on the card, a circuit will be completed through said contact to the "three" relay 3R1 of units group R1 which corresponds thereto.

The circuit through which the units relay is energized extends from the main line conductor L1 to the rotating brush, through the circuit previously traced, thence to the stationary stud contact 3c and along conductor 357 to the coil of the "three" relay 3R1 of the units group R1, thence along conductors 358 and 359 to the contacts associated with cams 201c and 201d of the cam commutator which are subsequently operated by the cams, thence through conductor 302 to line conductor L2. With the operation of the "three" units relay 3R1, or any relay of the units group R1, the opening of the back contact b thereof deenergizes the justifying relay which drops open, closing its lower back contacts "d" which extends the previously traced circuit of the lateral gate electromagnet 20LG10 through conductor 365 to the cam 201b contacts. Hence the next closure of the cam 201b contacts completes the circuit of the gate electromagnet through conductor 302 to the negative line conductor L2.

The card 10a now passes from the scanning rolls 131 into a card holder 28 which is so timed that it will be in proper position to receive the card. The card is given a slight horizontal buckle to give it sufficient stiffness to enter the clip. The cam 201b actuates its contacts at the proper time to actuate the proper gate vane 141 and route the card holder to its proper lateral row.

When the gate electromagnet 20LG10 is energized, it not only operates a gate vane 141 but it also closes its contacts a completing a stick circuit which holds it in until it is released at a later time by the operation of the cam 201a contact. This stick circuit extends from the electromagnet winding through conductors 367, 368 and by way of the cam 201a contacts through conductor 302 to line conductor L2, and it is therefore apparent that the next opening of the cam 201a contacts will release this lateral gate. The duration of this lock-in is sufficient to permit the guide pin 32 on the card holder 28 to enter its proper guide track.

The operation of the unit relay 3R1 by the fourth code impulse, as above set forth, also caused the closure of its front contact "a", completing a stick circuit which holds it in, even after the momentary impulse from the selector switch has expired.

The stick circuit extends from main line conductor L1 through conductor 344, contact a and coil of the relay 3R1, thence over conductors 358, 359 through the cam contacts 201c or 201d and by way of conductor 302 to the other line conductor L2.

The units relay 3R1 also additionally controls the electromagnet 3DGE (corresponding to one of the electromagnets 233 in Fig. 16) which actuates the dog gate for controlling the longitudinal distribution of the card. The closure of the front contacts "c" thereon, prepares a circuit which extends from the positive line conductor L1 through conductors 376 and 377 to the coil of said gate actuating electromagnet 3DGE, thence by way of conductor 378 through said front contact "c", on the units relay 3R1, and by way of conductors 379, 380 to the cam 201d contacts of the cam commutator and thence by way of conductor 302 to the negative line conductor L2.

When the electromagnet 3DGE pulls up, it not only actuates the dog gate DG for controlling the lateral position of the dog D on the bar 27, in a manner previously set forth in detail, but it also closes a pair of contacts "a" to complete a stick circuit for itself. The stick circuit extends from the coil through conductors 383, 384 to the back contact of the cam 201c of the cam commutator, and by conductor 302 to the other main line conductor L2.

It will be noticed that immediately after the gate electromagnets of both the tens and the units group have operated, the relays in both groups are immediately cleared in order that the next card coming through may make its proper set-up on these last two groups of relays. When the second card is completely scanned the opening of the contacts of the cam 201a contacts clears the gate electromagnets of the tens group R10, and the opening of the back contacts of cam 201c clears the previous set-up of gate electromagnets in the units group R1, thereby making ready for a complete new set-up of the relays in accordance with the next card which will be scanned.

In case there is no card feeding under the scanning rollers at any time when there should be a card in these rollers, the starting relays SR will be de-energized due to the fact that card contact 135 is open. Now, as the cam 201e contacts are closed each time a cycle of the machine occurs, with no card in the scanning rollers, the starting relay SR de-energized and its back contacts c closed, a circuit from the negative side of the line L1 will be completed through conductor 281, the cam 201e contacts, through conductor 386, the back contact "c" of the starting relay SR, through conductor 388, to the operating coil of the no card relay NCR and by conductors 389, 359 through contacts of cams 201c and 201d, and conductor 302 to line conductor L2. The closing of the no-card relay by the cam contacts will at the proper time cause the gate electromagnet 3DGE of the units group 1 to close. This operation of the electromagnet simply causes a condition so that the card clip 28 will not come up at any point under the card receiving compartments. As under this condition, if there is no card in the clip, there is no necessity for going through the motions of depositing a card.

The specific circuits controlled by the no card relay NCR may be traced as follows. The closure of the contacts "a" completes a stick circuit for the relay itself extending from line conductor L1 by way of conductor 281 thence through said contacts "a" and the coil of said relay NCR continuing along conductors 389 and 359, through the contacts of cams 201c or 201d of the cam commutator, thence by way of conductor 302 to the other line conductor L2.

The closure by the relay NCR of its contacts "b" completes a circuit for the electromagnet 3DGE extending from line conductor L1 by conductor 376 through said electromagnet winding thence by way of conductor 381, to said contact "b" and through conductors 382, 380, 381 and the front contact of cam 201d, through conductor 302 to the other main line conductor L2.

The purpose of the justifying relay JR is to pervent any card having an insufficient number of code lines from being routed on any of the tracks controlled by the lateral gate electromagnets LG. This control is simply effected by preventing the justifying relay from being de-energized until four complete code impulses have been received to set up a combination on both the tens and the units relay. As previously set forth, when any one of the relays in the units relay group R1 has been actuated, the justifying relay JR is de-energized, and its back contacts "d" close thereby permitting a set-up of a relay in the tens relay group R10. If, however, due to the absence of a code mark on a card, or the improper receiving of one code mark there is no operation of a relay in the units relay group 1, the justifying relay JR will remain energized and will prevent a set-up being made on the tens relays 20R10. Assuming that a proper set up has been made on the relays on both the units group R1 and the tens group R10 and the justifying relay JR has been de-energized, its back contacts "d" will extend to the cam 201d contacts the circuit of any lateral gate electromagnet LG which was previously prepared by one of the tens relays. For the purpose of the left and center contacts on the justifying relay see the explanation on the extra impulse relay EIR.

In case two cards enter the scanning rollers at one time, instead of one card, the card contacts 35 136 will be opened and this will open the circuit from line conductor L1 to the middle contacts of selector SW1 and selector SW10, thereby rendering these selectors inoperative and preventing a set-up being made from the top card. In this case no set-up is made, and the two cards will go through the machine to a rejection pocket.

In case a blank card enters the scanning rollers, i. e., a card with no code mark whatever, it is necessary to reject this card in a rejecting pocket provided for same. Now when a card enters the scanning rollers it so happens that it enters during the time the front contacts of cam 201d are closed, as shown, and the first code impulse must be transmitted during the time these contacts are closed or there will be no operation of selector SW10. At the same time that the first code impulse releases selector SW10, a circuit is completed through contacts "b" of the selector SW10 from the L2 side of the line through the lower back contact "f" of the blank relay BR thence to the operating coil of this relay. The connection of the other side of this coil being complete to line conductor L2 through its back contacts "b", thence through the front cam 201d contacts to the other side of the line, the blank relay BR will close on this first code impulse, and will lock itself in, as previously set forth. With the blank relay BR closed, the circuit to the selectors SW10 and SW1 comes through the front contact "c" of the blank relay, through the contacts of the primary relay, thence through the bottom or top right contacts of the transfer relay and on to the selectors. Therefore, in the case of a blank card there will be no first impulse to close the blank relay, and as the blank card goes through the scanning rollers there is no possibility of false impulses starting the selectors in operation and thereby causing an error in the sorting of the next card.

The purpose of the extra impulse relay EIR is to prevent a card having a superfluous mark, which would effect the control circuit as a code mark, from being routed to an improper destination. Assuming that a card having an extra mark has entered the scanning rollers 131, and that four marks have already been scanned and a set-up has been made on the units and the tens relay groups R1 and R10, the fourth mark will have already energized the extra impulse relay EIR. This is accomplished by the energization of any relay in the units relay group R1 and the energization of the starting relay SR.

The specific manner in which the energization of the extra impulse relay EIR is accomplished may be traced as follows. The engagement of the front contact "d" on any units relay completes a circuit which extends from line L1 through conductors 369 and 370, thence through said contacts "d" and by way of conductors 371 and 372 to the coil of the extra impulse relay EIR, thence through resistor r2, conductor 322, front contact "a" of the starting relay SR and by way of conductors 285, 286 to line conductor L2. The extra impulse relay now closes its contacts a, b and c, completing a stick circuit for itself through contact c. The stick circuit extends from the coil of the relay thence by way of conductor 372, contacts "c" and conductors 373, 294 and 281 to line conductor L1. The relay EIR will therefore remain energized until the start relay SR drops out and interrupts the stick circuit.

Now as the fifth or extra mark of the card is scanned, the contacts "a" of selector SW1 will be closed an extra time and this will connect the positive side of the line through contacts "a" of the selector SW1, through conductors 351 and 392 through the top contacts "a" of the extra impulse relay EIR, through conductor 394 and the back contacts "b" of the justifying relay JR, through said coil, thence by conductor 346, resistor r3 and conductor 286 to the negative line conductor L2, thereby again energizing the previously de-energized justifying relay JR and by opening its back contacts "d" causing the set-up on the switching relays R10 to be canceled out. The justifying relay JR also closes a stick circuit for itself through its upper front contact "a" and by way of conductor 383, through the center contacts b of the extra impulse relay EIR, and by conductors 295, 294 and 281 to the positive side of the line L1.

It so happens that occasionally the trailing end of the card will produce a false impulse. However, this should not cancel out the set-up as it is in no way caused by an error on the card. In order to prevent this final trailing impulse from canceling the set-up, means are provided for short-circuiting the coil of the justifying relay JR at this time. The brush on the selector SW1, at the time the trailing end of the card reaches the scanning point, will be on one of the two interconnected stud contacts immediately following contact 9c and with a false impulse under these conditions the operation of the contacts "a" on selector SW1 will simply short out the coil of the justifying relay JR. This short-circuit extends from the rotating brush 174, to said interconnected stud contacts of selector SW1, through conductor 395 the middle contacts c of the justifying relay JR, through conductor 346 thence, through the relay coil and by way of contact "b" and conductor 394, contacts "a" of relay EIR and conductors 393 and 352 back to the rotating brush 174.

It should be noted that, although only a single operation of the machine was traced, in actual operation, the machine sorts a great many documents in rapid succession. The term "scanning means" and "scanner" are not used restrictively, but are used to designate any means for searching a coded card.

It will be seen that I have provided an improved sorting machine which will sort various cards or documents which are not in perfect condition, to a maximum number of pockets with a minimum amount of mechanism and controlling apparatus comprising safety devices for preventing the erroneous delivery of a document when various abnormal conditions occur.

Although I have shown and described certain specific embodiments of my invention, I am fully aware that many modifications thereof are possible. My invention, therefor, is not to be restricted except as necessitated by the prior art and the scope of the appended claims.

I claim as my invention:

1. In combination a document feeding mechanism, scanning means, a plurality of pockets arranged in rows extending laterally and longitudinally, a distributing system for carrying documents to said pockets, a document having data thereon constituting an original record and a coded indication comprising pairs of marks spaced apart according to a function of the original record, and means responsive to the actuation of said scanning means by one of said pairs of spaced marks for controlling the distributing system to determine the lateral delivery of the document, and means responsive to the actuation of said scanning means by another pair of said spaced marks for controlling the distributing system to determine the longitudinal delivery of the document.

2. A document sorting machine comprising a feeding mechanism, a scanning means, a distributing system, a plurality of pockets arranged in rows extending laterally and longitudinally for receiving documents delivered by said distributing system, and means actuated by the scanning means responsive to the spacing of indicia on each document for controlling the lateral delivery of said distribution system, and means actuated by the scanning means responsive to the spacing of other indicia on the document for controlling the longitudinal delivery of said distribution system.

3. In a sorting machine, a document feeding mechanism, scanning means, a distributing system, a plurality of pockets arranged in rows extending laterally and longitudinally for receiving documents delivered by said distributing system, and means responsive to actuation of said scanning means by indicia on the documents for controlling the lateral delivery of said system, and means responsive to actuation of said scanning means by other indicia on the documents for controlling the longitudinal delivery of said system.

4. A sorting machine including a plurality of pockets arranged in rows extending laterally and longitudinally, a distributing system comprising a plurality of document carrying holders, adapted to normally pass freely under said pockets, means responsive to indicia on each document for moving its holder laterally into alignment with a selected longitudinal row of pockets and means responsive to other indicia on the document for moving said holder to pocket engaging position as it approaches the predetermined lateral row of pockets whereby it will deposit the document in its predetermined pocket instead of passing freely thereunder.

5. A sorting machine including a plurality of pockets arranged in rows extending laterally and longitudinally, a feeding mechanism, scanning means, a distributing system comprising a plurality of slidably mounted document holders normally carried freely under said pockets, means responsive to actuation of the scanning means by indicia on a document for moving the holder which carries said document laterally into alignment with a longitudinal row of pockets selected in accordance therewith, and means responsive to the actuation of the scanning means by other indicia on the document for moving said holder into its depositing position as it approaches the lateral row of pockets corresponding to said other indicia whereby it will deposit the document in the predetermined pocket instead of passing freely thereunder.

6. A distributing system for an automatic sorting machine comprising a pair of endless sprocket chains supported by sprocket wheels, means for driving said wheels including means for rigidly interconnecting said wheels whereby they will rotate at identical speeds in fixed phase relation, a plurality of pairs of rods extending transversely between said chains, a plurality of clips, means for slidably supporting one of said clips on each pair of rods, a plurality of pockets arranged in rows extending laterally above said clips, a guide pin depending from each of said clip supporting means, and a guideway extending angularly from the center to alignment with each laterally disposed row of pockets and arranged to receive the guide pins and divert the clips laterally as they are moved along by said sprocket chains.

7. A distributing system for an automatic sorting machine comprising a pair of endless sprocket chains supported by sprocket wheels, means for driving said wheels including means for rigidly interconnecting said wheels whereby they will rotate at identical speeds in fixed phase relation, a plurality of pairs of rods extending transversely between said chains, a plurality of clips, means for slidably supporting one of said clips on each pair of rods, a plurality of pockets arranged in rows extending laterally above said card clips, a guide pin depending from each of said clip supporting means, a guideway extending angularly from the center to alignment with each laterally disposed row of pockets and arranged to receive the guide pins and divert the clips laterally as they are moved along by said sprocket chains, gates for controlling the entrance of the guide pins into the guideways, and a pair of angularly disposed guide bars mounted adjacent the return path of the clips for slidably diverting the clips to the center when they are moving in the reverse direction.

8. A distributing system for an automatic sorting machine comprising a pair of endless sprocket chains supported by sprocket wheels, means for driving said wheels including means for rigidly interconnecting said wheels whereby they will rotate at identical speeds in fixed phase relation, a plurality of pairs of rods extending transversely between said chains, a plurality of document holders, means for pivotally supporting one of said document holders on each pair of rods, a plurality of pockets arranged in rows extending longitudinally above and normally clear of said document holders, means for tilting said each document holder toward a pocket for depositing a document therein.

9. A distributing system for an automatic sorting machine comprising a pair of endless sprocket chains supported by sprocket wheels, means for driving said wheels including means for rigidly interconnecting said wheels whereby they will rotate at identical speeds in fixed phase relation, a plurality of pairs of rods extending transversely between said chains, a plurality of document holders, means for slidably and pivotally supporting one of said document holders on each pair of rods, a plurality of pockets arranged in rows extending laterally and longitudinally above said card holders, means controllable for moving document holders laterally into alignment with a selected longitudinal row of pockets and means for moving each document holder into pocket engaging position for depositing a document as it approaches a selected lateral row of pockets.

10. In combination a document holder for sorting machines comprising a resilient clip for receiving a document, a rod, and means for pivotally and slidably supporting said document holder on the rod, document receiving pockets, each having a slot in the lower edge of the rear wall thereof and supported above the path of travel of said clip whereby the latter normally passes freely therethrough, a bar, and a cam carried thereby for pivotally moving said clip for causing it to engage a pocket and deposit its document in the bottom thereof.

11. In a distributing system for automatic sorting machines, a pair of endless sprocket chains supported by sprocket wheels, rigidly interconnected means for driving said wheels whereby they will rotate at identical speeds in fixed phase relation, a plurality of document carriers associated therewith each of which comprises a rod supported transversely between said chains, a document holder pivotally mounted on said rod, a bar disposed transversely between said sprocket chains and pivotally supported thereby, a cam carried by said bar in engaging relation with said document holder whereby rotation of said bar controls the movement of said document holder to normal carrying or to delivering position respectively, a dog slidably mounted on said bar, a plurality of pockets arranged longitudinally, a stationary cam disposed adjacent each longitudinal pocket in staggered lateral arrangement such that they are not in longitudinal alignment, and means for sliding the dog along the bar whereby it will be in position for engaging any selected stationary cam as it is moved along by the chain to move said document holder and deposit a document in the corresponding longitudinal pocket.

12. In a sorting machine, a pair of endless sprocket chains supported by sprocket wheels, rigidly interconnected means for driving said wheels whereby they will rotate at identical speeds in fixed phase relation, a plurality of document carriers associated therewith each of which comprises a rod supported transversely between said chains, a document holder pivotally mounted on said rod, a bar disposed transversely between said sprocket chains and pivotally supported thereby, a cam carried by said bar in engaging relation with said document holder whereby rotation of said bar controls the movement of said document holder to normal carrying or to delivering position respectively, a dog slidably mounted on said bar, a plurality of pockets arranged longitudinally, a stationary cam disposed adjacent each longitudinal pocket in staggered lateral arrangement such that they are not in longitudinal alignment, gates corresponding to said cams and angularly disposed whereby the movement of the dog as it is carried along causes it to slide along the bar, means controllable by a document to be sorted for opening the gate which is in alignment with the stationary cam corresponding to the predetermined longitudinal position of the document whereby the dog may pass freely therethrough without further slidable movement on the bar and will engage the corresponding stationary cam thereby rotating the cam and moving the document holder to delivering position adjacent the selected longitudinal pocket.

13. A document separating and feeding mechanism for card sorting machines comprising a hopper, a separating roll thereunder, a feed roll adjacent said hopper, a separating knife between the separating roll and the feed roll, and mechanism for rotating the separating roll back with a short slow movement for buckling the lowermost document in the hopper to separate it from the stack and rotating the roll forward with a quick long movement to project the document forward under the separating knife into the feed roll including means for turning the separating knife upwardly when the document is buckled back.

14. In combination in a document sorting machine, scanning means, feeding rolls for moving each document while it is being scanned, a timing stop for ensuring that each document is advanced by the rolls at a predetermined time with reference to the angular position of the feed rolls, a depressed area in the surface of said feed roll for facilitating the operation of said timing stop, a second depressed area in the surface of said roll whereby the document will be momentarily released and a squaring finger for applying a light pressure on the edge of each document as it is advanced whereby it will be squared with the scanning means when it is momentarily released.

15. In combination a scanner, a plurality of pockets, arranged in rows extending laterally and longitudinally, a distributing system for carrying documents to said pockets, a bank of relays, means responsive to the spacing between a pair of marks on a document for setting up a relay in said bank corresponding thereto for controlling lateral delivery of said system, a second bank of relays, means responsive to the spacing between a second pair of marks on the document for setting up a relay of said second bank corresponding thereto to control longitudinal delivery of said system, means responsive to the actuation of said scanner by the fourth mark for preparing said set relays, means responsive to a fifth mark for cancelling said set-up, and means for thereafter rendering said set-up effective to control the distribution system if it has not been cancelled.

DOUGLASS A. YOUNG.